United States Patent
Lee et al.

(10) Patent No.: US 10,468,718 B2
(45) Date of Patent: Nov. 5, 2019

(54) ELECTROLYTE, METHOD OF PREPARING THE ELECTROLYTE, AND LITHIUM SECONDARY BATTERY COMPRISING THE ELECTROLYTE

(71) Applicant: Samsung Electronics Co., Ltd., Suwon-si, Gyeonggi-do (KR)

(72) Inventors: Yonggun Lee, Incheon (KR); Yooseong Yang, Yongin-si (KR); Hongsoo Choi, Seoul (KR); Jenam Lee, Seongnam-si (KR); Wonseok Chang, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 106 days.

(21) Appl. No.: 14/855,657

(22) Filed: Sep. 16, 2015

(65) Prior Publication Data
US 2016/0087306 A1   Mar. 24, 2016

(30) Foreign Application Priority Data

Sep. 19, 2014   (KR) .................. 10-2014-0125250
Apr. 30, 2015   (KR) .................. 10-2015-0062013

(51) Int. Cl.
*H01M 10/0565* (2010.01)
*H01M 10/0525* (2010.01)
*H01M 10/052* (2010.01)

(52) U.S. Cl.
CPC ..... *H01M 10/0565* (2013.01); *H01M 10/052* (2013.01); *H01M 10/0525* (2013.01); *H01M 2300/0082* (2013.01)

(58) Field of Classification Search
None
See application file for complete search history.

(56) References Cited

U.S. PATENT DOCUMENTS

| 4,357,215 A | 11/1982 | Goodenough et al. |
| 7,097,942 B2 | 8/2006 | Hwang et al. |
| 7,473,491 B1 * | 1/2009 | Amine ............... H01B 1/122 |
| | | 429/188 |

(Continued)

FOREIGN PATENT DOCUMENTS

| CN | 101466750 A | 6/2009 |
| JP | 3236857 B2 | 10/2001 |

(Continued)

OTHER PUBLICATIONS

Extended Search Report issued by the European Patent Office dated Mar. 2, 2016 w/English Translation.

(Continued)

*Primary Examiner* — Christopher P Domone
(74) *Attorney, Agent, or Firm* — Cantor Colburn LLP

(57) ABSTRACT

An electrolyte including a copolymer including (i) an ion-conductive domain including an ion-conductive segment of the copolymer, wherein the ion-conductive segment includes a plurality of ion-conductive units, and (ii) a structural domain including a structural segment of the copolymer, wherein the structural segment includes a plurality of structural units, wherein the ion-conductive domain and the structural domain are covalently linked, and a polymer network phase coupled to the ion-conductive domain.

36 Claims, 11 Drawing Sheets

(56) References Cited

U.S. PATENT DOCUMENTS

| | | | |
|---|---|---|---|
| 7,513,136 B2 | 4/2009 | Laliberte et al. | |
| 7,531,012 B2 | 5/2009 | Sudano et al. | |
| 7,547,492 B2 | 6/2009 | Awano et al. | |
| 7,968,224 B2 | 6/2011 | Sudano et al. | |
| 8,137,849 B2 | 3/2012 | Kang et al. | |
| 8,445,140 B2 | 5/2013 | Bertin et al. | |
| 8,513,359 B2 | 8/2013 | Millward | |
| 8,563,168 B2 | 10/2013 | Balsara et al. | |
| 9,601,766 B2 | 3/2017 | Song et al. | |
| 9,748,597 B2 | 8/2017 | Shon et al. | |
| 2003/0094599 A1* | 5/2003 | Le | C08G 18/2027 252/500 |
| 2009/0263725 A1 | 10/2009 | Balsara et al. | |
| 2010/0221614 A1* | 9/2010 | Bertin | C08F 293/005 429/309 |
| 2011/0206994 A1 | 8/2011 | Balsara et al. | |
| 2011/0281173 A1 | 11/2011 | Singh et al. | |
| 2012/0110835 A1* | 5/2012 | Hudson | H01M 4/0404 29/623.1 |
| 2012/0231346 A1* | 9/2012 | Tsujii | H01G 9/038 429/306 |
| 2013/0136998 A1 | 5/2013 | Hwang et al. | |
| 2013/0236764 A1 | 9/2013 | Hu et al. | |
| 2013/0280579 A1* | 10/2013 | Wright | H01B 1/122 429/124 |
| 2014/0066539 A1 | 3/2014 | Tobing et al. | |
| 2015/0155594 A1 | 6/2015 | Lee et al. | |
| 2016/0013515 A1 | 1/2016 | Lee et al. | |
| 2016/0064770 A1 | 3/2016 | Lee et al. | |
| 2016/0064772 A1 | 3/2016 | Choi et al. | |
| 2016/0072148 A1 | 3/2016 | Lee et al. | |
| 2016/0079625 A1 | 3/2016 | Shon et al. | |
| 2016/0087306 A1 | 3/2016 | Lee et al. | |
| 2016/0093879 A1 | 3/2016 | Song et al. | |
| 2016/0093916 A1 | 3/2016 | Moon et al. | |

FOREIGN PATENT DOCUMENTS

| | | |
|---|---|---|
| JP | 4098359 B2 | 3/2008 |
| JP | 2009-531820 A | 9/2009 |
| JP | 2013-532360 A | 8/2013 |
| WO | 2013134566 A3 | 9/2013 |

OTHER PUBLICATIONS

Office Action dated May 10, 2016 for the Korean Patent Application No. 10-2015-0062013 (with English translation).

Aikifa Raza et al. "In situ cross-linked superwetting nanofibrous membranes for ultrafast oil-water separation", J. Mater. Chem. A. 2014, 2, 10137.

Chia-Jung Wu et al. "Robust and Adhesive Hydrogels from Cross-Linked Polyethylene glycol) and Silicate for Biomedical Use", Macromol. Biosci. 2013, 13, 59-66.

Yan-Jie Wang, et al. "The effect of F127 addition on the properties of PEGDA/PVdF cross-linked gel polymer electrolytes", Journal of Membrane Science 312 (2008) 76-83.

Frances I. Allen et al. "Deciphering the three-dimensional morphology of free-standing block copolymer thin films by transmission electron microscopy", Micron 44 (2013) 442-450.

Jason A. Burdick et al. "Moving from static to dynamic complexity in hydrogel design", Nature Communications, | 3:1269 | DOI:10.1038/ncomms, published Dec. 11, 2012, 8 pp.

Office Action issued by the Chinese Patent Office dated Sep. 30, 2018 in the examination of the Chinese Patent Application No. 201510598780.9, with English Translation.

* cited by examiner

ELECTROLYTE, METHOD OF PREPARING THE ELECTROLYTE, AND LITHIUM SECONDARY BATTERY COMPRISING THE ELECTROLYTE

CROSS-REFERENCE TO RELATED APPLICATIONS

This application claims priority to and the benefit of Korean Patent Application Nos. 10-2014-0125250, filed on Sep. 19, 2014, and 10-2015-0062013, filed on Apr. 30, 2015, in the Korean Intellectual Property Office, the disclosure of which are incorporated herein in their entirety by reference.

BACKGROUND

1. Field

The present disclosure relates to an electrolyte, a method of preparing the electrolyte, and a lithium secondary battery including the electrolyte.

2. Description of the Related Art

Lithium secondary batteries are high-performance batteries having the highest energy density among other currently available secondary batteries, and are applicable in various fields such as electric vehicles.

A lithium secondary battery may use a lithium thin film as an anode. Due to the high reactivity of lithium, when the lithium thin film is used as an anode, the film may be highly reactive to liquid electrolyte during charging or discharging of the battery. This reactivity may also lead to dendritic growth of the reaction products on the lithium thin film anode. Accordingly, a lithium secondary battery including such a lithium metal thin film may have reduced lifetime and stability.

Therefore, there is a need for a lithium secondary battery having improved cell performance.

SUMMARY

Provided are an electrolyte and a method of preparing the electrolyte.

Provided is a lithium secondary battery with improved cell performance that includes the electrolyte.

Additional aspects will be set forth in part in the description which follows and, in part, will be apparent from the description, or may be learned by practice of the presented embodiments.

According to an aspect, an electrolyte includes
a copolymer including
  (i) an ion-conductive domain including an ion-conductive segment of the copolymer, wherein the ion-conductive segment includes a plurality of ion-conductive units, and
  (ii) a structural domain including a structural segment of the copolymer, wherein the structural segment includes a plurality of structural units, wherein the ion-conductive domain and the structural domain are covalently linked, and
a polymer network phase coupled to the ion-conductive domain.

The electrolyte may further include at least one selected from a liquid electrolyte, a solid electrolyte, a gel electrolyte, a polymer ionic liquid, and a separator.

According to another aspect, a method of preparing an electrolyte includes:
  obtaining an electrolyte composition that includes a copolymer including
    (i) an ion-conductive domain including an ion-conductive segment of the copolymer, wherein the ion-conductive segment includes a plurality of ion-conductive units, and
    (ii) a structural domain including a structural segment of the copolymer, wherein the structural segment includes a plurality of structural units, wherein the ion-conductive domain and the structural domain are covalently linked,
    (iii) a polymerizable reactive group-including compound, and
    (iv) a polymerization initiator; and
  radiating light or applying heat onto the electrolyte composition to obtain the above-described electrolyte.

According to another aspect, a lithium secondary battery includes:
  an anode,
  a cathode, and
  the above-described electrolyte disposed between the anode and the cathode.

The anode may be a lithium metal or lithium metal alloy electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
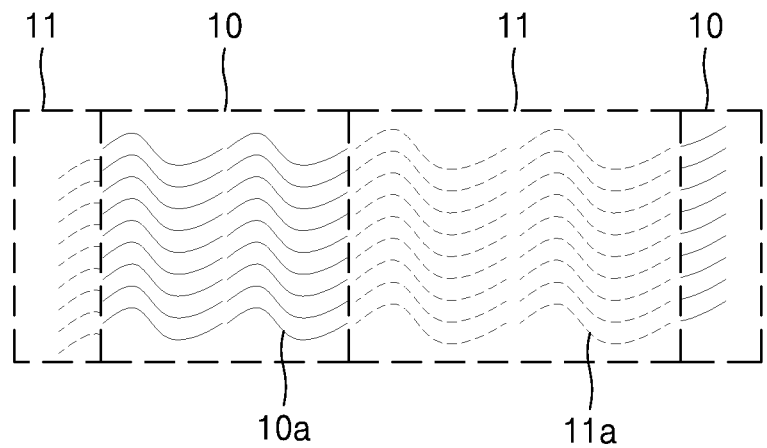
FIGS. 1A and 1B are schematic drawings illustrating a formation process of a block copolymer for an electrolyte according to an embodiment of the present disclosure.

Reference will now be made in detail to embodiments of an electrolyte, a method of preparing the electrolyte, and a lithium secondary battery including the electrolyte, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an aspect of the present disclosure, an electrolyte includes
    a copolymer that includes
        (i) an ion-conductive domain including an ion-conductive segment of the copolymer, wherein the ion-conductive segment includes a plurality of ion-conductive units, and
        (ii) a structural domain including a structural segment of the copolymer, wherein the structural segment includes a plurality of structural units, wherein the ion-conductive domain and the structural domain are covalently linked, and
    a polymer network phase coupled to the ion-conductive domain.

The ion-conductive domain is related to the ionic conductivity of the copolymer, and the structural domain is related to the mechanical properties of the copolymer.

The copolymer can be any copolymer, for example, a block copolymer.

The polymer network phase obtained through a polymerization of a polymerizable group-including compound may include a polymerization product of the polymerizable group-including compound, wherein the polymerizable group-including compounds are covalently bound. The polymer network phase may be physically (non-covalently) coupled to the ion-conductive domain. The physical binding refers to binding via a non-covalent bond, for example, via a coordination bond, a hydrogen bond, or via a van der Waals force, for example, by way of electrostatic interactions of ions with one another, with neutral molecules, or with charged molecules.

The polymer network phase may generally be obtained through a polymerization of at least one polymerizable reactive group-including compound. The polymerizable reactive group-including compound may be at least one selected from a multi-functional monomer with a polymerizable reactive group, an inorganic particle with a polymerizable reactive group, and an ionic liquid with a polymerizable reactive group. Accordingly, the polymer network phase may include a reaction product of these polymerizable reactive group-including compounds.

The polymerizable reactive group may be any functional group that may take part in polymerization. Non-limiting examples of the polymerizable reactive group include a functional group with an ethylenically unsaturated bond, a hydroxyl group, an amino group, an amide group, a three-membered heterocyclic group (such as an epoxy group, an aziridine group, and an episulfide group), a four-membered heterocyclic group (such as an oxetane group, an azetidine group, and a thietane group), a carboxylic acid group, and an aldehyde group. Non-limiting examples of the functional group with an ethylenically unsaturated bond are a vinyl group, an allyl group, an acryl group, a methacryl group, a vinyloxy group, an allyloxy group, an acryloxy group (—O(C=O)CH=CH$_2$), a methacryloxy group (—O(C=O)CH=CHCH$_3$), a methacryloxypropyl group, and non-limiting examples of the epoxy group include a glycidoxypropyl group, and an epoxycyclohexyl group.

For example, the polymerizable group-including compound may include at least one selected from a lithium ion-conductive moiety and a hydrophilic moiety. As used herein, the term "moiety" refers to any structural fragment, which is a part of a molecule. The term "moiety" can refer to a part of a monomer molecule or to a polymer unit, which is a part of a polymer molecule. When preparing an electrolyte using a polymerizable group-including compound including these moieties, polymerization of the polymerizable group-including compound may occur in an ion-conductive domain to form a polymer network phase in the ion-conductive domain, so that the resulting electrolyte may include a copolymer with the ion-conductive domain including the polymer network phase.

The lithium ion-conductive moiety may be, for example, an alkylene oxide moiety. In the alkylene oxide moiety, oxygen may form a coordinate bond with lithium, which may facilitate diffusion of lithium and thus improve the conductivity of lithium ions. The hydrophilic moiety may be selected from, for example, α, β-ethylenically unsaturated C$_3$-C$_6$ monocarboxylic acid, α,β-ethylenically unsaturated C$_4$-C$_6$ dicarboxylic acid, and monoesters or monoamide derivatives thereof. In some embodiments, the hydrophilic moiety may be any moiety derived from, for example, acrylic acid, methacrylic acid, maleic acid, or itaconic acid, or C$_1$-C$_{22}$ alcohol monoesters or monoamides thereof. For example, the hydrophilic moiety may be a moiety derived from acrylic acid and/or methacrylic acid. In some other embodiments, the hydrophilic moiety may be a moiety including an amine or amino group, or a moiety including a siloxane group.

A conventional electrolyte with good mechanical properties may not have satisfactory ionic conductivity. On the other hand, a conventional electrolyte with good ionic conductivity may not have satisfactory mechanical properties. Accordingly, there has been a need for a simultaneous improvement in both ion conductivity and mechanical properties. A problem with such conventional electrolytes is that dendrites from products of the reaction between a lithium-metal electrode with an electrolyte may be readily formed due to non-uniform ion distribution in the electrolyte-electrode interface.

However, an electrolyte according to any of the above-described embodiments may have improved mechanical properties when it includes a copolymer including a polymer network phase in the ion-conductive domain thereof. The electrolyte may also have improved ionic conductivity due to an increased size of the ion-conductive domain and the lithium ion-conductive moiety. The mechanical strength of the electrolyte may also be maintained unless the block copolymer includes an organic electrolyte in the ion-conductive domain.

The electrolyte may suppress dendrite formation due to the ensured uniform ion distribution in the electrolyte-electrode interface.

An electrolyte according to any of the above-described embodiments may have improved mechanical properties of the ion-conductive domain due to the inclusion of a polymer network phase in the ion-conductive domain. The electrolyte may have improved ionic conductivity due to the increased size of the ion-conductive domain and the inclusion of a lithium ion-conductive moiety such as ethylene oxide in the polymer network phase of the ion-conductive domain. The electrolyte may have ensured stability against a liquid electrolyte, for example, a carbonate organic solvent or a liquid electrolyte including a carbonate organic solvent. The ion-conductive domain of the block copolymer may trap the liquid electrolyte.

In some embodiments, the polymer segment including an ion-conductive repeating unit may be a non-crosslinked polymer. This non-crosslinked polymer may include at least one of a linear polymer and a branched polymer.

In some embodiments of the electrolyte including a copolymer that includes an ion-conductive domain and a structural domain covalently linked to the ion-conductive domain, at least one terminal of the non-crosslinked ion-conductive segment of the copolymer may be linked to the structural domain of the copolymer.

In some embodiments, the electrolyte including a copolymer that includes an ion-conductive domain and a structural domain covalently linked to the ion-conductive domain may facilitate formation of a nanostructure due to easy microphase separation of the ion-conductive domain and the structural domain, unlike a simple polymer blend of polymer including an ion-conductive repeating unit and a polymer including a structural repeating unit. Accordingly, the electrolyte may have improved ionic conductivity, mechanical characteristics, and stability with respect to liquid electrolyte. Therefore, a lithium secondary battery with improved capacity retention rate may be manufactured using any of the electrolytes according to the embodiments.

The multi-functional monomer with a polymerizable group may be at least one selected from a C5-C30 (meth)acrylate ester having at least two carbon-carbon double bonds, a poly(C3-C30 (meth)acrylate ester) having at least two carbon-carbon double bonds, a C4-C30 aliphatic compound having at least two carbon-carbon double bonds, and a C4-C30 aromatic compound having at least two carbon-carbon double bonds.

For example, the multi-functional monomer with a polymerizable reactive group may be at least one selected from polyethylene glycol diacrylate, polyethylene glycol dimethacrylate, ethoxylated trimethylolpropane triacrylate, ethoxylated trimethylolpropane trimethacrylate, 1,4-butadiene, 1,6-hexadiene, allyl acrylate, acrylated cinnamate, isoprene, butadiene, chloroprene, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, ethylene glycol (meth)acrylate, 1,2-propylene glycol (meth)acrylate, 1,3-propylene glycol (meth)acrylate, acrylic acid, methacrylic acid, 2-(meth)acryloyloxy acetic acid, 3-(meth)acryloyloxy propionic acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth) acrylamide, N-vinylpyrrolidone, ethylene dimethacrylate, diethylene glycol dimethacrylate, triethylene glycol dimethacrylate, trimethylol propane trimethacrylate, trimethylol propane triacrylate, 1,3-butanediol di(meth)acrylate, 1,6-hexanediol di(meth)acrylate, and N-vinyl caprolactam.

The amount of the multi-functional monomer with a polymerizable reactive group may be in a range of about 5 parts to about 50 parts, and in some embodiments, about 10 parts to about 40 parts by weight, based on 100 parts by weight of the copolymer including the ion-conductive domain and the structural domain. While not wishing to be bound by a theory, it is understood that when the amount of the multi-functional monomer with a polymerizable reactive group is within these ranges, the electrolyte may have an improved ionic conductivity without deterioration in mechanical characteristics.

The inorganic particles having a polymerizable reactive group may be any kind of inorganic particles having any of the polymerizable reactive group listed above. The polymerizable reactive group may be attached to the surface of the inorganic particles. In an embodiment, the plurality of inorganic particles may be selected from an oxide, a hydroxide, a carbonate, a carboxylate, a silicate, an aluminosilicate, a carbide, or a nitride of at least one element selected from Ti, Si, Al, Zr, Zn, Sn, B, Sr, Ca, Ba, In, and W, or a graphene oxide. The plurality of inorganic particles may also include a combination of the above compounds. For example, the inorganic particles with a polymerizable reactive group may be at least one selected from $SiO_2$, cage-structured silsesquioxane with a polymerizable reactive group, $TiO_2$ with a polymerizable reactive group, ZnO with a polymerizable reactive group, $Al_2O_3$ with a polymerizable reactive group, $BaTiO_3$ with a polymerizable reactive group, and a metal-organic framework (MOF) with a polymerizable reactive group.

For example, the cage-structured silsesquioxane may be a polyhedral oligomeric silsesquioxane (POSS). The number of silicon atoms in the POSS may be about 8 or less, for example, 6 or 8, and a polymerizable reactive group may be bound to at least one of the silicon atoms.

For example, the cage-structured silsesquioxane may be a compound represented by Formula 1.

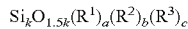 Formula 1

In Formula 1, at least one of $R^1$, $R^2$, and $R^3$ may be a polymerizable reactive group, and the rest of the reactive group of $R^1$, $R^2$, and $R^3$ may be non-polymerizable. For example, the rest of the reactive group of $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 1, k=a+b+c, and 6≤k≤20.

A non-limiting example of the polymerizable reactive group is at least one selected from a functional group having an ethylenically unsaturated bond, a hydroxyl group, an amino group, an amide group, an epoxy group, a carboxyl group, and an aldehyde group. For example, the polymerizable reactive group may be a vinyl group, an allyl group, a vinyloxy group, an allyloxy group, an acryl group, a methacryl group, an acryloxy group (—O(C=O)CH=CH$_2$), a methacryloxy group (—O(C=O)CH=CHCH$_3$), a methacryloxypropyl group, a glycidoxypropyl group, an epoxycyclohexyl group, or the like.

The cage-structured silsesquioxane may be a compound represented by Formula 2 or a compound represented by Formula 3.

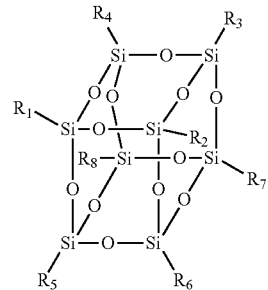

Formula 2

In Formula 2, at least one of $R_1$ to $R_8$ may be a polymerizable reactive group, and the rest non-polymerizable reactive group of $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

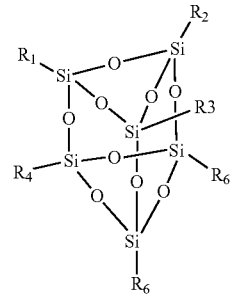

Formula 3

In Formula 3, at least one of $R_1$ to $R_6$ may be a polymerizable reactive group, and the rest of $R_1$ to $R_6$ may be non-polymerizable reactive groups. For example, the rest of $R_1$ to $R_6$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

At least one of $R_1$ to $R_8$ in Formula 2 and at least one of $R_1$ to $R_6$ in Formula 3 may be a vinyl group, an allyl group, a vinyloxy group, an allyloxy group, an acryl group, a methacryl group, an acryloxy group (—O(C=O)CH=CH$_2$), a methacryloxy group (—O(C=O)CH=CHCH$_3$), a methacryloxypropyl group, a glycidoxypropyl group, or an epoxycyclohexyl group.

In some embodiments, in the compound of Formula 2 or 3 as a cage-structured silsesquioxane, $R_1$ to $R_7$ may be heptaisobutyl groups, and $R_8$ may be a methacryloxypropyl group. For example, the cage-structured silsesquioxane may be, for example, methacryloxypropyl heptaisobutyl-t8-silsesquioxane.

The amount of the inorganic particles with the polymerizable reactive group may be in a range of about 1 part to about 40 parts, and in some embodiments, about 5 parts to about 20 parts, by weight based on 100 parts by weight of the copolymer including the ion-conductive domain and the structural domain. While not wishing to be bound by a theory, it is understood that when the amount of the inorganic particles with a polymerizable reactive group is within these ranges, an electrolyte with improved mechanical characteristics and improved ionic conductivity may be manufactured.

The metal-organic framework (MOF) may be a porous crystalline compound in which a Group 2 to Group 15 element ion or a Group 2 to Group 15 element ionic cluster is chemically bonded to an organic ligand.

The organic ligand refers to an organic group that may form an organic bond such as coordinate bond, ionic bond, or covalent bond. For example, an organic group having at least two binding sites for such element ions as described above may form a stable structure through binding with the element ions.

The Group 2 to Group 5 element ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one of compounds selected from an aromatic dicarboxylic acid, an aromatic tricarboxylic acid, an imidazole compound, a tetrazole compound, a 1,2,3-triazole compound, a 1,2,4-triazole compound, a pyrazole compound, an aromatic sulfonic acid, an aromatic phosphoric acid, an aromatic sulfinic acid, an aromatic phosphinic acid, a bipyridine, and compounds having at least one functional group selected from an amino group, an imino group, an amide group, a dithio carboxylic acid group (—C(=S)SH), a dithio carboxylate group (—C(=S)S$^-$), a pyridine group, and a pyrazine group.

Non-limiting examples of the aromatic dicarboxylic acid and the aromatic tricarboxylic acid are benzene dicarboxylic acid, benzene tricarboxylic acid, biphenyl dicarboxylic acid, and terphenyl-dicarboxylic acid.

For example, the organic ligand may be a group derived from any of the compounds represented by the following Formulae 4.

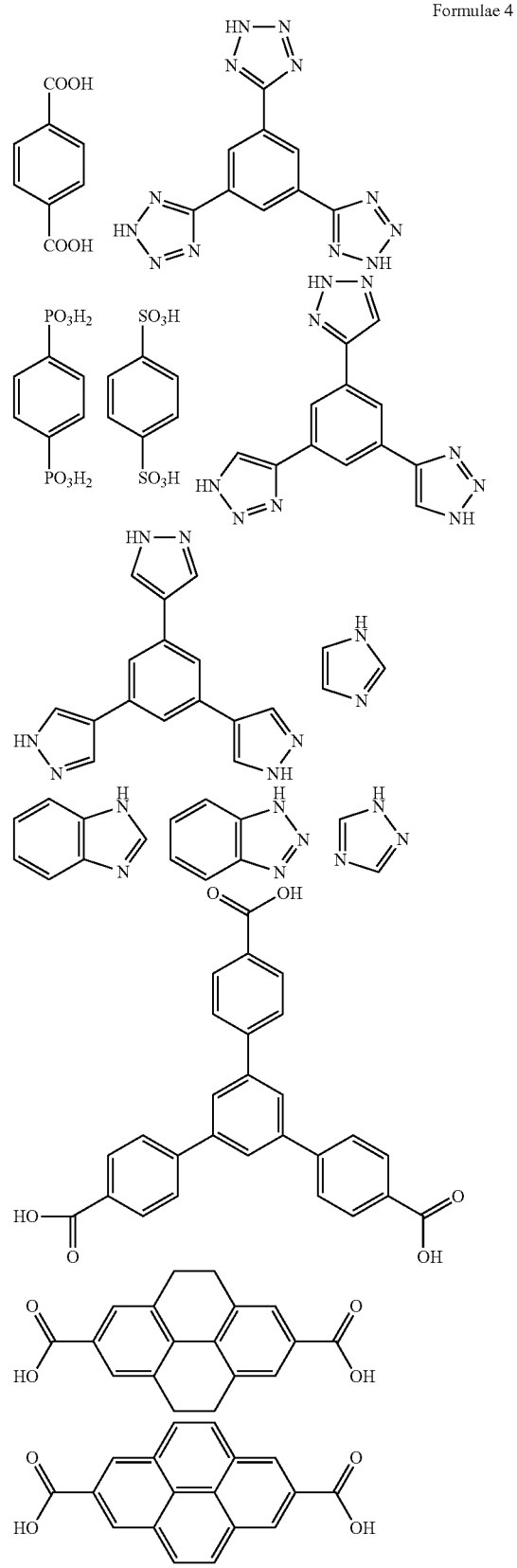

Formulae 4

The metal-organic framework may be, for example, Ti$_8$O$_8$(OH)$_4$[O$_2$C—C$_6$H$_4$—CO$_2$]$_6$, Cu(bpy)(H$_2$O)$_2$(BF$_4$)$_2$(bpy)

{wherein, bpy=4, 4'-bipyridine}, Zn$_4$O(O$_2$C—C$_6$H$_4$—CO$_2$)$_3$ (Zn-terephthalic acid-MOF, Zn-MOF), or Al(OH){O$_2$C—C$_6$H$_4$—CO$_2$}.

The ionic liquid having a polymerizable reactive group may be any ionic liquid having a functional group that may take part in the polymerization reaction.

An ionic liquid refers to a salt in a liquid state at room temperature or a molten salt at room temperature that consists of only ions having a melting point which is equal to or below room temperature. The ionic liquid may be at least one selected from compounds each including:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and combination thereof, and ii) an anion of at least one selected from BF$_4^-$, PF$_6^-$, AsF$_6^-$, SbF$_6^-$, AlCl$_4^-$, HSO$_4^-$, ClO$_4^-$, CH$_3$SO$_3^-$, CF$_3$CO$_2^-$, Cl$^-$, Br$^-$, I$^-$, CF$_3$SO$_3^-$, (C$_2$F$_5$SO$_2$)$_2$N$^-$, (C$_2$F$_5$SO$_2$)(CF$_3$SO$_2$)N$^-$, (FSO$_2$)$_2$N$^-$, (CF$_3$SO$_2$)$_2$N$^-$, NO$_3^-$, Al$_2$Cl$_7^-$, CH$_3$COO$^-$, CF$_3$SO$_3^-$, (CF$_3$SO$_2$)$_3$C$^-$, (FSO$_2$)$_2$N—, (CF$_3$)$_2$PF$_4^-$, (CF$_3$)$_3$PF$_3^-$, (CF$_3$)$_4$PF$_2^-$, (CF$_3$)$_5$PF$^-$, (CF$_3$)$_6$P$^-$, SF$_5$CF$_2$SO$_3^-$, SF$_5$CHFCF$_2$SO$_3^-$, CF$_3$CF$_2$(CF$_3$)$_2$CO$^-$, (CF$_3$SO$_2$)$_2$CH$^-$, (SF$_5$)$_3$C$^-$, (C$_2$F$_5$SO$_2$)(CF$_3$SO$_2$)N$^-$, and (O(CF$_3$)$_2$C$_2$(CF$_3$)$_2$O)$_2$PO$^-$. The cation may have a polymerizable reactive group.

The ionic liquid having a polymerizable reactive group may have any cation represented by Formulae 5.

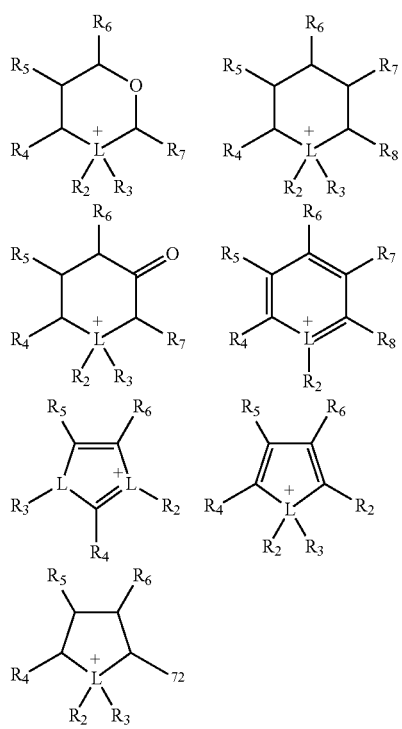

Formulae 5

In Formulae 5,

L indicates N or P; and

R$_2$ to R$_8$ may be each independently a hydrogen, a unsubstituted or substituted C1-C30 alkyl group, a unsubstituted or substituted C1-C30 alkoxy group, a unsubstituted or substituted C6-C30 aryl group, a unsubstituted or substituted C6-C30 aryloxy group, a unsubstituted or substituted C3-C30 heteroaryl group, a unsubstituted or substituted C3-C30 heteroaryloxy group, a unsubstituted or substituted C4-C30 cycloalkyl group, or a unsubstituted or substituted C3-C30 heterocycloalkyl group, wherein at least one of R$_2$ to R$_8$ is a polymerizable reactive group, for example, a C2-C10 alkenyl group.

In some embodiments, the ionic liquid having a polymerizable reactive group may be 1-allyl-3-methylimidazolium bis(trifluoromethylsulfonyl)imide represented by Formula 6 or 1-allyl-3-butylimidazolium bis(trifluoromethylsulfonyl)imide represented by Formula 7.

Formula 6

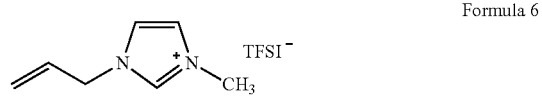

TFSI=bis(trifluoromethylsulfonyl)imide)

Formula 7

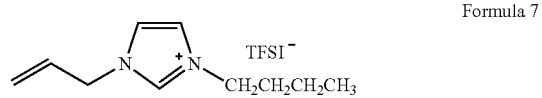

The amount of the ionic liquid having a polymerizable reactive group may be in a range of about 5 parts to about 40 parts by weight, and in some embodiments, about 10 parts to about 20 parts by weight, based on 100 parts by weight of the copolymer including the ion-conductive domain and the structural domain. While not wishing to be bound by a theory, it is understood that when the amount of the ionic liquid having a polymerizable reactive group is within the above ranges, an electrolyte with improved ionic conductivity and improved mechanical properties may be obtained.

The ion-conductive segment including the ion-conductive repeating unit may be derived from a polymer including an ion-conductive repeating unit in the backbone or in the side chain thereof to form a polymer matrix for electrolyte. The ion-conductive repeating unit may be any unit with ionic conductivity, for example, an alkylene oxide unit such as ethylene oxide.

The ion-conductive repeating unit of the ion-conductive segment is responsible for the ionic conductivity of the copolymer. For example, the ion-conductive repeating unit of the ion-conductive segment may be at least one derived from a monomer selected from an ether monomer, an acrylic monomer, a methacrylic monomer, an amine monomer, an imide monomer, an alkylcarbonate monomer, a nitrile monomer, a phosphazene monomer, an olefin monomer, a diene monomer, and a siloxane monomer.

The ion-conductive segment including the ion-conductive repeating unit may be derived, for example, from at least one selected from polyethylene oxide, polypropylene oxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, polydecylacrylate, polyethylene vinyl acetate, polyimide, polyamine, polyamide, polyalkyl carbonate, polynitrile, polyphosphazene, polyolefin, and polydiene.

In some embodiments, the electrolyte may further include at least one kind of inorganic particles selected from $SiO_2$, $TiO_2$, ZnO, $Al_2O_3$, $BaTiO_3$, cage-structured silsesquioxane, and a metal-organic framework (MOF). In an embodiment, the inorganic particles may be selected from an oxide, a hydroxide, a carbonate, a carboxylate, a silicate, an aluminosilicate, a carbide, or a nitride of at least one element selected from Ti, Si, Al, Zr, Zn, Sn, B, Sr, Ca, Ba, In, and W, or a graphene oxide. The plurality of inorganic particles may also include a combination of the above compounds. When the electrolyte further includes the above described inorganic particles, the electrolyte may have further improved mechanical properties. The inorganic particles may have an average particle diameter of equal to or less than 100 nanometers (nm). For example, the inorganic particles may have an average particle diameter of about 1 nm to about 100 nm, and in some embodiments, about 5 nm to about 100 nm, and in some embodiments, about 10 nm to about 100 nm, and in some other embodiments, about 10 nm to about 70 nm, and in still other embodiments, about 30 nm to about 70 nm. While not wishing to be bound by a theory, it is understood that when the average particle diameter of the inorganic particles is within these ranges, it may be possible to prepare an electrolyte having improved film formability and improved mechanical properties without deterioration in ionic conductivity.

In some embodiments, the polymer network phase may include a reaction product of:
i) at least one polymerizable reactive group-including compound selected from a multi-functional monomer with a polymerizable reactive group, a plurality of inorganic particles with a polymerizable reactive group, and an ionic liquid with a polymerizable reactive group, and
ii) at least one monofunctional monomer selected from a monofunctional acrylic monomer and a monofunctional methacrylate monomer.

When such a monofunctional monomer is added, the monofunctional monomer may terminate a polymerization reaction of the polymerizable reactive group-including compound. When a monofunctional monomer is added, the electrolyte may have further improved flexibility, binding strength, and mechanical strength, compared to the electrolyte prepared when no monofunctional monomer is added.

The monofunctional monomer, as a compound including one functional group that may take part in polymerization reaction, may be at least one selected from butyl acrylate, ethyl acrylate, methyl methacrylate, ethyl methacrylate, 2-ethylhexyl acrylate, decylacrylate, ethylene vinyl acetate, ethylene glycol monoacrylate, ethylene glycol monomethacrylate, hexyl acrylate, hexyl methacrylate, 2-ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, 1,1,1,3,3,3-hexafluoro isopropyl acrylate, 1,1,1,3,3,3-hexafluoro isopropyl methacrylate, 2,2,3,3,4,4,4-heptafluorobutyl acrylate, 2,2,3,3,4,4,4-heptafluorobutyl methacrylate, 2,2,3,3,4,4,5,5-octafluoropentyl acrylate, 2,2,3,3,4,4,5,5-octafluoropentyl methacrylate, 2,2,3,3,4,4,5,5,6,6,7,7-dodecafluoroheptyl acrylate, 2,2,3,3,4,4,5,5,6,6,7,7-dodecafluoroheptyl methacrylate, 3,3,4,4,5,5,6,6,7,7,8,8-tridecafluorooctyl acrylate, and 3,3,4,4,5,5,6,6,7,7,8,8-tridecafluorooctyl methacrylate.

The amount of the monofunctional monomer may be in a range of about 0.1 part to about 50 parts, and in some embodiments, about 5 parts to about 20 parts by weight, based on 100 parts by weight of the copolymer including the ion-conductive domain and the structural domain. While not wishing to be bound by a theory, it is understood that when the amount of the monofunctional monomer is within these ranges, an electrolyte with improved mechanical properties may be manufactured without deterioration in ion conductivity or ion mobility.

Figure 1B:
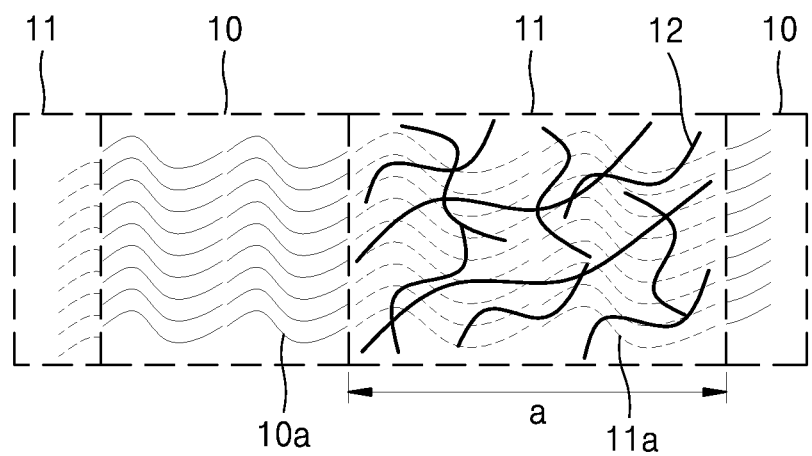

FIGS. 1A and 1B illustrates formation of a block copolymer for an electrolyte according to an embodiment of the present disclosure. Referring to FIGS. 1A and 1B, the block copolymer includes a structural domain 10 and an ion-conductive domain 11. The structural domain 10 may include a structural segment 10a having a structural repeating unit, and the ion-conductive domain 11 may include an ion-conductive segment 11a having an ion-conductive repeating unit.

When a polymerizable reactive group-including compound is added to the block copolymer to prepare an electrolyte according to an embodiment of the present disclosure, a polymer network phase 12 may be formed in the ion-conductive domain 11 by way of covalent bonding of the polymerizable reactive group-including compound by a polymerization reaction. The polymer network phase 12 may be physically (non-covalently) bound to an ion-conductive segment 11a in the ion-conductive domain 11. The physical binding between the polymer network phase 12 and the ion-conductive segment 11a refers to a non-covalent bonding as opposed to a chemical bonding.

The inclusion of the polymer network phase 12 in the ion-conductive domain 11 as described above may lead to an increased size "a" of the ion-conductive domain 12.

An electrolyte according to any of the above-described embodiments may further include an ionic liquid.

An ionic liquid refers to a salt which is present in a liquid state at room temperature or a molten salt that consists of only ions, and has a melting point which is equal to or below room temperature. The ionic liquid may be at least one selected from compounds each including:
i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and
ii) an anion of at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, $(FSO_2)_2N^-$, and $(CF_3SO_2)_2N^-$.

For example, the ionic liquid may be at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

In some embodiments, the amount of the polymer network phase in the electrolyte may be in a range of about 5% to about 50% by volume based on 100% of a total volume of the ion-conductive domain. While not wishing to be bound by a theory, it is understood that when the amount of the polymer network phase is within this range, an electrolyte having improved ion conductivity and improved mechanical characteristics may be obtained.

In some embodiments, the electrolyte may be prepared as a free-standing membrane.

The structural repeating unit of the block copolymer is responsible for the mechanical properties of the block copolymer. The structural repeating unit may be derived from, but not limited to, at least one monomer selected from styrene, 4-bromostyrene, tert-butyl styrene, divinyl benzene, methyl methacrylate, isobutyl methacrylate, butadiene, ethylene, propylene, dimethyl siloxane, isobutylene, N-isopropylacrylamide, vinylidene fluoride, acrylonitrile, 4-methyl 1-pentene, butylene terephthalate, ethylene terephthalate, and vinyl pyridine.

A structural segment including the structural repeating unit may be derived from at least one selected from polystyrene, hydrogenated polystyrene, polymethacrylate, poly(methyl methacrylate), polyvinylpyridine, polyimide, polyamide, polyethylene, polyisobutylene, polybutylene, polypropylene, poly(4-methyl-1-pentene), polybutylene terephthalate, poly(isobutyl methacrylate), poly(ethylene terephthalate), polydimethylsiloxane, polyacrylonitrile, polymaleic acid, polymaleic anhydride, polyamide, polymethacrylic acid, poly(cyclohexyl methacrylate), poly(cyclohexyl vinylether), poly(tert-butyl vinylether), polyvinylidene fluoride, and polydivinylbenzene, or may be a copolymer including at least two repeating units of these polymers.

The block copolymer may have a mixed mole ratio of the ion-conductive repeating unit to the structural repeating unit of the block copolymer in a range of about 0.1:99.9 to about 99.9:0.1, for example, in a range of about 10:90 to about 90:10.

The ion-conductive domain may have a size of about 10 nm to about 300 nm, for example, about 10 nm to about 100 nm. The above size ranges of the ion-conductive domain may be identified by transmission electron microscopy or small-angle X-ray scattering (SAXS), for example, using a scattering angle of a Bragg's scattering peak in each domain. While not wishing to be bound by a theory, it is understood that when the size of the ion-conductive domain is within these ranges, an electrolyte with an improved ionic conductivity may be obtained.

The ion-conductive domain may include a polymer block that includes an ion-conductive repeating unit. This polymer block may have a weight average molecular weight of about 10,000 Daltons (Da) or greater, and in some embodiments, about 10,000 to about 500,000 Daltons, and in some other embodiments, about 15,000 to about 100,000 Daltons. While not wishing to be bound by a theory, it is understood that when the polymer block has a weight average molecular weight within these ranges, a degree of polymerization of the polymer block may be within an appropriate range, and thus a polymer electrolyte with an improved ionic conductivity may be obtained using the polymer block.

The structural domain may include a polymer block that includes a structural repeating unit. This polymer block may have a weight average molecular weight of about 10,000 Daltons (Da) or greater, and in some embodiments, about 10,000 to about 500,000 Daltons, and in some other embodiments, about 15,000 to about 400,000 Daltons or greater.

The amount of the polymer block of the structural domain may be in a range of about 20 parts to about 45 parts by weight based on 100 parts by weight of a total weight of the block copolymer. While not wishing to be bound by a theory, it is understood that when the polymer block of the structural domain has a weight average molecular weight within the above ranges, a polymer electrolyte with improved mechanical properties and improved ionic conductivity may be obtained using the polymer block.

In some embodiments, the block copolymer for the electrolyte may be a linear or branched block copolymer. The linear block copolymer may be in any form, for example, lamellar, cylindrical, or gyroid form.

Non-limiting examples of the branched block copolymer are a graft polymer, a star-shaped polymer, a comb polymer, a brush polymer, and the like.

The block copolymer may be at least one selected from a diblock copolymer (A-B) and a triblock copolymer (A-B-A' or B-A-B'), wherein the blocks A and A' may be one ion-conductive polymer block, each independently selected from polyethylene oxide, polypropylene oxide, polysiloxane, polyethylene oxide-grafted polymethyl methacrylate (PEO-grafted PMMA), and polysiloxane-grafted PMMA, and the blocks B and B' may be one structural polymer block, each independently selected from polystyrene (PS), polydivinyl benzene, polymethyl methacrylate, polyvinyl pyridine, polyimide, polyethylene, polypropylene, polyvinylidene fluoride, polyacrylonitrile, and polydimethylsiloxane.

The block copolymer may include a second ion-conductive domain and a second structural domain which is adjacent to the second ion-conductive domain. The second ion-conductive and structural domains may or may not be the same as the first ion-conductive and structural domains. The second ion-conductive domain may be a PEO block, a polysiloxane block, a PPO block, a PEO-grafted PMMA block, or a polysiloxane-grafted PMMA block. The second structural domain may be a PS block, a PMMA block, a polypropylmethacrylate block, a poly(n-butylmethacrylate) block, a poly(t-butylmethacrylate) block, a polyvinylpyridine block, a polyimide block, a polyethylene block, a polypropylene block, a PVdF block, a PAN block, or a PDMS block.

The block copolymer may be an organic-inorganic block copolymer, for example, an organic-inorganic silicon structure-containing block copolymer including a first domain including an ion-conductive polymer block, and a second domain including a non-conducting polymer and an organic-inorganic silicon structure.

The organic-inorganic silicon structure may include a graft copolymer block in which the organic-inorganic silicon structure is covalently bonded to a grafted side chain connected to a backbone of the structural domain. The organic-inorganic silicon structure may include a silsesquioxane group represented by Formula 1:

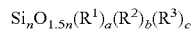        Formula 1 wherein, in Formula 1, n=a+b+c+1, and 6≤n≤20, and $R^1$, $R^2$, and $R^3$ are each independently at least one selected from a hydrogen atom, an organic functional group, and a silicon functional group.

In some embodiments, the block copolymer of the electrolyte may include:
i) a block copolymer including first block of polystyrene and a second block that includes polyethylene oxide and a reaction product of one selected from polyethylene glycol diacrylate and polyethylene glycol dimethacrylate;
ii) a block copolymer including a first block of polystyrene, a second block that includes polyethylene oxide and a reaction product of one selected from polyethylene glycol diacrylate and polyethylene glycol dimethacrylate, and a third block of polystyrene;
iii) a block copolymer including a first block of polystyrene, and a second block that includes polyethylene oxide and a reaction product of one selected from trimethylolpropane triacrylate and trimethylolpropane trimethacrylate;

iv) a block copolymer including a first block of polystyrene, and a second block that includes polyethylene oxide and a reaction product of one selected from trimethylolpropane triacrylate and trimethylolpropane trimethacrylate, and a third block of polystyrene;

v) a block copolymer including a first block of polystyrene, and a second block that includes polyethylene oxide and a reaction product of one selected from polyethylene glycol diacrylate and polyethylene glycol dimethacrylate, and polyhedral oligomeric silsesquioxane (POSS) with an acrylate group;

vi) a block copolymer including a first block of polystyrene, a second block that includes polyethylene oxide and a reaction product of one selected from polyethylene glycol diacrylate and polyethylene glycol dimethacrylate, and POSS with an acrylate group, and a third block of polystyrene;

vii) a block copolymer including a first block of polystyrene, and a second block that includes polyethylene oxide and a reaction product of one selected from trimethylolpropane triacrylate and trimethylolpropane trimethacrylate, and POSS with an acrylate group; or viii) a block copolymer including a first block of polystyrene, a second block that includes polyethylene oxide and a reaction product of one selected from trimethylolpropane triacrylate and trimethylolpropane trimethacrylate, and POSS with an acrylate group, and a third block of polystyrene.

When the block copolymer is a triblock copolymer including a first block, a second block, and a third block, the amounts of the first and third blocks may be each independently in a range of about 14.5 parts to about 17.85 parts by weight based on 100 parts by weight of a total weight of the block copolymer, and the amount of the second block may be in a range of about 64.3 parts to about 71.0 parts by weight based on 100 parts by weight of the total weight of the block copolymer.

When the block copolymer is a diblock polymer including a first block and a second block, the amount of the first block may be in a range of about 29 parts to about 35.7 parts by weight based on 100 parts by weight of a total weight of the block copolymer, and the amount of the second block may be in a range of about 64.3 parts to about 71.0 parts by weight based on 100 parts by weight of the total weight of the block copolymer.

In some embodiments, the block copolymer may be polystyrene-b-(polyethylene oxide)-b-polystyrene block copolymer in a weight ratio of about 10:36:10 (or about 17.85:64.3:17.85) or about 12:59:12 (or about 14.5:71:14.5) of polystyrene, polyethylene oxide, and polystyrene.

In some embodiments, the electrolyte may further include at least one selected from an alkali metal salt and an alkali earth metal salt to have further improved ionic conductivity.

The amount of the at least one selected from the alkali metal salt and the alkali earth metal salt may be in a range of about 10 parts to about 70 parts by weight, for example, about 20 parts to about 50 parts by weight, based on 100 parts by weight of a total weight of the block copolymer.

The amount of the at least one selected from the alkali metal salt and the alkali earth metal salt may be controlled to have a mole ratio of about 1:5 to about 1:30, for example, about 1:10 to about 1:20, with respect to an ion-conductive unit of the ion-conductive segment of the copolymer. For example, the ion-conductive unit may be an ethylene oxide unit.

While not wishing to be bound by a theory, it is understood that when the amount of the at least one selected from an alkali metal salt and an alkali earth metal salt is within the above ranges, the electrolyte may have high ionic conductivity. Non-limiting examples of the alkali metal salt or alkali earth metal salt are chlorides, hydrides, nitrides, phosphides, sulfonamides, triflates, thiocyanates, perchlorates, borates, or selenides each including an alkali metal or an alkali earth metal. Non-limiting examples of the alkali metal or alkali earth metal are lithium, sodium, potassium, barium, and calcium.

For example, the alkali metal salt or alkali earth metal salt may be at least one selected from LiSCN, $LiN(CN)_2$, $LiClO_4$, $LiBF_4$, $LiAsF_6$, $LiPF_6$, $LiCF_3SO_3$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(CF_2CF_3)_3$, $LiPF_3(CF_3)_3$, $LiB(C_2O_4)_2$, NaSCN, $NaSO_3CF_3$, KTFSI, NaTFSI, $Ba(TFSI)_2$, and $Ca(TFSI)_2$. For example, the alkali metal salt or alkali earth metal salt may be at least one lithium salt selected from $LiClO_4$, $LiCF_3SO_3$, $LiBF_4$, $LiN(CF_3SO_2)_2$, $LiN(FSO_2)_2$, $LiN(C_2F_5SO_2)_2$, $LiPF_6$, $LiAsF_6$, $LiSbF_6$, and $LiPF_3(CF_2CF_3)_3$.

In some embodiments, the electrolyte may further include an ionic liquid. When the electrolyte includes an ionic liquid and a lithium salt, a mole ratio (IL/Li) of the ionic liquid to lithium ions may be in a range of about 0.1 to about 2.0, for example, about 0.2 to about 1.8, and in some other embodiments, about 0.4 to about 1.5. While not wishing to be bound by a theory, it is understood that when the electrolyte has a mole ratio of the ionic liquid to lithium ions within these ranges, the electrolyte may have high lithium ion mobility, high ionic conductivity, and improved mechanical properties to effectively suppress growth of lithium dendrite on an anode surface of a lithium secondary battery.

When the electrolyte includes an ionic liquid and a lithium salt, a mixed mole ratio of lithium to ethylene oxide may be in a range of about 1:5 to about 1:30.

In some embodiments, the electrolyte may include a reaction product obtained by radiation of light or by application of heat onto a composition that includes:

i) a block copolymer including a polymer block having an ion-conductive repeating unit and a polymer block having a structural repeating unit, ii) at least one polymerizable reactive group-including compound, and iii) a polymerization initiator, wherein the at least one polymerizable reactive group-including compound is selected from a multi-functional monomer with a polymerizable reactive group, an inorganic particles with a polymerizable reactive group, and an ionic liquid with a polymerizable reactive group. This may ensure the electrolyte has the improved mechanical properties, which are able to suppress growth of lithium dendrite, and consequently the electrolyte may have improved lithium ion mobility and improved ionic conductivity.

In X-ray diffraction spectra of the electrolyte with respect to a CuK-α X-ray wavelength of 1.541 Angstroms (Å), an intensity ratio $\{I(P_B)/I(P_A)\}$ of peak $P_B$ to peak $P_A$ may be in a range of about 1.0 to about 1.3, for example, about 1.02 to about 1.23, wherein the peak $P_A$ and the peak $P_B$ are related with interchain crystallinity and intrachain crystallinity, respectively, in a polymer block of the ion-conductive domain of the block copolymer including an ion-conductive domain and a structural domain covalently linked to the ion-conductive domain. When the intensity ratio $\{I(P_B)/I(P_A)\}$ of peak $P_B$ to peak $P_A$ is within these ranges, cross-linking may occur in the polymer block with increased interchain crystallinity, increasing the size of the ion-conductive domain.

reduced intrachain crystallinity and increased interchain crystallinity

The peak $P_A$ related with the interchain crystallinity in the polymer block refers to a peak appearing at a diffraction angle of about 11° to 13°, for example, at about 12°, and the peak $P_B$ related with the intrachain crystallinity refers to a peak appearing at a diffraction angle of about 17° to about 20°, for example, at about 19°.

The presence of the compound with a polymerizable reactive group remaining unreacted in the electrolyte may be identified by thermogravimetry (TGA) and/or infrared ray (IR) analysis.

The electrolyte may be used as a solid polymer electrolyte for solid state batteries, or as an electrolyte for lithium secondary batteries including lithium sulfur batteries, lithium air batteries, lithium ion batteries, lithium polymer batteries.

In other words, the electrolyte may be a mixed electrolyte that further includes at least one selected from a liquid electrolyte, a solid electrolyte, a gel electrolyte, a polymer ionic liquid, an inorganic particle, and a separator.

In some embodiments, the lithium secondary battery may further include at least one selected from a liquid electrolyte, a polymer ionic liquid, a solid electrolyte, and a gel electrolyte. The at least one of a liquid electrolyte, a polymer ionic liquid, a gel electrolyte, and a solid electrolyte may be disposed between the cathode and the electrolyte.

While not wishing to be bound by a theory, it is understood that when at least one selected from a liquid electrolyte, a polymer ionic liquid, a solid electrolyte, and a gel electrolyte is further included, the lithium secondary battery may have further improved ionic conductivity and mechanical properties.

The liquid electrolyte may further include at least one selected from an organic solvent, an ionic liquid, an alkali metal salt, and an alkali earth metal salt. Non-limiting examples of the organic solvent are a carbonate compound, a glyme compound, and a dioxolane compound.

Non-limiting examples of the carbonate solvent are ethylene carbonate, propylene carbonate, dimethyl carbonate, fluoroethylene carbonate, diethyl carbonate, or ethylmethyl carbonate. The glyme solvent may be, for example, at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

The dioxolane compound may be, for example, at least one selected from 1,3-dioxolane, 4,5-diethyl-1,3-dioxolane, 4,5-dimethyl-1,3-dioxolane, 4-methyl-1,3-dioxolane, and 4-ethyl-1,3-dioxolane. In some other embodiments, the organic solvent may be 2,2-dimethoxy-2-phenyl acetophenone, diethoxy ethane, tetrahydrofuran, or gamma-butyrolactone.

The polymer ionic liquid may be, for example, a polymerization product of ionic liquid monomers, or a polymeric compound. The polymer ionic liquid is highly soluble in an organic solvent, and thus may further improve the ionic conductivity of the electrolyte when further added.

During the synthesis of a polymer ionic liquid by polymerization of ionic liquid monomers as described above, the resulting polymer product may be washed and dried, and may be used in a subsequent anionic substitution reaction to obtain appropriate anions that may improve solubility of the polymerization product in an organic solvent.

In some embodiments, the polymer ionic liquid may include a repeating unit that includes:
i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and
ii) an anion of at least one selected from $BF_4^-$, $PF_6^-$, $AsF_6^-$, $SbF_6^-$, $AlCl_4^-$, $HSO_4^-$, $ClO_4^-$, $Cl^-$, $Br^-$, $I^-$, $SO_4^{2-}$, $CF_3SO_3^-$, $CF_3CO_2^-$, $(C_2F_5SO_2)(CF_3SO_2)N^-$, $NO_3^-$, $Al_2Cl_7^-$, $CH_3COO^-$, $CH_3SO_3^-$, $(CF_3SO_2)_3C^-$, $(CF_3CF_2SO_2)_2N^-$, $(CF_3SO_2)_2N^-$, $(FSO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some embodiments, the polymer ionic liquid may be prepared by polymerization of ionic liquid monomers. These ionic liquid monomers may have a functional group polymerizable with a vinyl group, an allyl group, an acrylate group, and a methacrylate group, and may include a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and at least one of the above-listed anions.

Non-limiting examples of the ionic liquid monomers are 1-vinyl-3-ethylimidazolium bromide, a compound represented by Formula 8, or a compound represented by Formula 9.

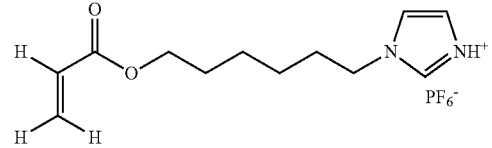

Formula 8

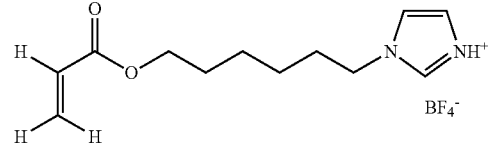

Formula 9

For example, the polymer ionic liquid may be a compound represented by Formula 10 or a compound represented by Formula 11.

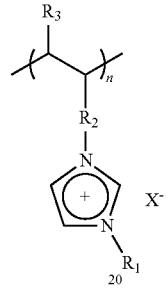

Formula 10

In Formula 10, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$X^-$ indicates an anion of the ionic liquid; and n may be from 500 to about 2,800.

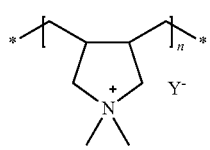

Formula 11

In Formula 11, $Y^-$, which corresponds to $X^-$ in Formula 10, may be, for example, bis(trifluoromethanesulfonyl)imide (TFSI), bis(fluorosulfonyl)imide, $BF_4$, or $CF_3SO_3$; and n may be in a range of 500 to 2,800.

The polymer ionic liquid may include, for example, a cation of at least one selected from poly(l-vinyl-3-alkylimidazolium) cation, poly(l-allyl-3-alkylimidazolium) cation, and poly(1-(methacryloyloxy-3-alkylimidazolium) cation, and an anion of at least one selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$. For example, the compound of Formula 11 may be polydiallydimethyl ammonium bis(trifluoromethanesulfonyl)imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme). The low-molecular weight polymer may have a weight average molecular weight of about 75 to about 2,000, for example, a weight average molecular weight of about 250 to about 500.

The thermally stable ionic liquid may be the same as those listed above in conjunction with the above-described ionic liquid. The lithium salt may be any of the compounds described above as alkali metal salts as long as it includes lithium as an alkali metal.

When the electrolyte further includes a gel electrolyte, the electrolyte may have further improved conductivity. The gel electrolyte may be any electrolyte in gel form known in the art.

For example, the gel electrolyte may include a polymer and a polymer ionic liquid. For example, the polymer may be a solid graft (block) copolymer electrolyte.

In some embodiments, the electrolyte may further include a solid electrolyte. For example, the solid electrolyte may be an organic solid electrolyte or an inorganic solid electrolyte.

Non-limiting examples of the organic solid electrolyte are polyethylene derivatives, polyethylene oxide derivatives, polypropylene oxide derivatives, a phosphoric acid ester polymer, a polyester sulfide, a polyvinyl alcohol, a polyfluoride vinylidene, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (wherein M is a rare earth element, such as Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 \leq x \leq 0.8$, $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$, $0 < y \leq 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), $Li_{7+x}A_xLa_{3-x}Zr_2O_{12}$ (wherein $0 \leq x \leq 3$, and A is Zn).

In some embodiments, the electrolyte may be in solid or gel form. The electrolyte may be formed as a membrane, a film, or a sheet having a thickness of about 200 μM or less, in some embodiments, about 0.1 μm to about 100 μm, and in some embodiments, about 1 μm to about 40 μm. An electrolyte in the form of a sheet, a film, or a membrane may be formed using a known technology, such as spin coating, roll coating, curtain coating, extruding, casting, screen printing, or inkjet printing.

An electrolyte according to any of the above-described embodiments may have improved ionic conductivity, improved lithium ion mobility, improved mechanical properties, and improved stability against liquid electrolyte. Accordingly, the electrolyte may serve as a protective layer for lithium metal. Consequently, problems with lithium secondary batteries related to their lifetime and safety, caused from the dendrite formation by highly reactive lithium, may be prevented with the instant electrolyte. Therefore, a lithium secondary battery with improved capacity retention rate may be manufactured using an electrolyte according to any of the above-described embodiments.

In some embodiments, the electrolyte may have an ionic conductivity at room temperature (25° C.) of about $1 \times 10^{-4}$ Siemens per centimeter (S/cm) or greater, for example, about $5 \times 10^{-4}$ to about $1 \times 10^{-3}$ S/cm. The electrolyte may have a Young's modulus at room temperature (25° C.) of about 4.0 mega Pascals (MPa) or greater, for example, about 4 MPa to about 50 MPa. Accordingly, an electrolyte according to any of the above-described embodiments may have good ionic conductivity and good mechanical properties at room temperature that are desired for satisfactory battery performance.

According to another aspect of the present disclosure, a method of manufacturing an electrolyte includes:

obtaining an electrolyte composition that includes a copolymer including:

(i) an ion-conductive domain including an ion-conductive segment of the copolymer, wherein the ion-conductive segment includes a plurality of ion-conductive units, and (ii) a structural domain including a structural segment of the copolymer, wherein the structural segment includes a plurality of structural units, wherein the ion-conductive domain and the structural domain are covalently linked, (iii) a polymerizable reactive group-including compound, and (iv) a polymerization initiator; and radiating light or applying heat onto the electrolyte composition to obtain the electrolyte according to any of the above-described embodiments.

The polymerization initiator may be a photopolymerization initiator or a thermopolymerization initiator.

The photopolymerization initiator may be any compound able to form a radical by irradiation of light such as ultraviolet (UV) light. For example, the photopolymerization initiator may be at least one selected from 2-hydroxy-2-methyl-1-phenyl-propane-1-one (HMPP), benzoin ether, dialkyl acetophenone, hydroxyl alkylketone, phenyl glyoxylate, benzyl dimethyl ketal, acyl phosphine, and α-aminoketone. For example, the acyl phosphine may be commercially available lucirin TPO, i.e., 2,4,6-trimethyl-benzoyl-trimethyl phosphine oxide.

The thermopolymerization initiator may be at least one selected from a persulfate initiator, an azo initiator, and an initiator including hydrogen peroxide and ascorbic acid. Non-limiting examples of the persulfate initiator are sodium persulfate ($Na_2S_2O_8$), potassium persulfate ($K_2S_2O_8$), and ammonium persulfate (($NH_4)_2S_2O_8$). Non-limiting examples of the azo initiator are 2,2-azobis(2-amidinopropane)dihydrochloride, 2,2-azobis-(N, N-dimethyl)isobutyramidine dihydrochloride, 2-(carbamoylazo)isobutylonitrile, 2,2-azobis[2-(2-imidazoline-2-yl)propane] dihydrochloride, 4,4-azobis-(4-cyanovaleric acid), and the like.

The amount of the polymerization initiator may be in a range of about 0.005 parts to about 5.0 parts by weight based on 100 parts by weight of the copolymer. If the amount of the polymerization initiator is within this range, a rapid polymerization may occur.

An organic solvent may be added to the electrolyte composition. The organic solvent may be any solvent available as an organic solvent in the art. Non-limiting examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and combinations thereof. An amount of the solvent may be from about 100 parts to about 3,000 parts by weight based on 100 parts by weight of the copolymer.

In some embodiments, the method may further include adding at least one selected from:
  i) at least one monofunctional monomer selected from a monofunctional acrylate monomer and a monofunctional methacrylate monomer,
  ii) at least one selected from an ionic liquid and a polymer ionic liquid,
  iii) inorganic particles, and
  iv) at least one selected from an alkali metal salt and an alkali earth metal salt.

In the electrolyte preparion method, the light may include ultraviolet (UV) rays.

When polymerization is performed by such light to form the electrolyte on a lithium metal thin film, thermal deformation of the lithium metal thin film may be prevented.

The duration of the polymerization by light or heat may vary, for example, may be in a range of about 1 minutes (min) to about 30 min.

An electrolyte in the form of a membrane may be formed by coating the electrolyte composition on a base, drying to form an electrolyte membrane, and separating the electrolyte membrane from the base.

The coating may be performed by any method available to form electrolytes in the art, for example, using spin coating, roll coating, curtain coating, extruding, casting, screen printing, or inkjet printing.

The electrolyte may be electrochemically stable in a voltage range of about 0 Volts (V) to about 5.5 V, and in some embodiments, about 0 V to about 5.0 V, and in some other embodiments, about 0 V to about 4.0 V, with respect to lithium. An electrolyte according to any of the above-described embodiments may have an electrochemically stable wide voltage window, and thus may be applicable in electrochemical devices operating at high voltage.

In any of the electrolytes according to the above-described embodiments, a current density resulting from side reactions other than intercalation/deintercalation of lithium at a voltage of about 0 V with respect to lithium may be about 0.05 milli Amperes per square centimeter ($mA/cm^2$) or less, and in some embodiments, about 0.02 $mA/cm^2$ or less, and in some other embodiments, about 0.01 $mA/cm^2$ or less.

For example, a current density of the electrolyte resulting from oxidation reaction at a voltage of about 5.0 V with respect to lithium may be about 0.05 $mA/cm^2$ or less, and in some embodiments, about 0.04 $mA/cm^2$ or less, and in some other embodiments, about 0.02 $mA/cm^2$.

In some embodiments, the electrolyte may have an oxidation current or reduction current of about 0.05 $mA/cm^2$ or less in a voltage range of about 0.0 V to about 6.0 V with respect to lithium metal.

In some embodiments, the electrolyte may have an ionic conductivity at 25° C. of about $3.0 \times 10^{-6}$ S/m or greater, for example, about $4.7 \times 10^{-6}$ S/m, and a tensile strength at 25° C. of 2.0 MPa or greater, for example, about 2.4 MPa.

In some embodiments, an interfacial resistance (R) at 25° C. between the electrolyte and lithium metal derived from a Nyquist plot that is obtained from an impedance measurement may be less than the resistance of bare lithium metal by at least 10%.

According to another aspect of the present disclosure, a lithium secondary battery includes:
  a cathode,
  an anode, and
  an electrolyte according to the above-described embodiments disposed between the cathode and the anode.

The lithium secondary battery may have good voltage characteristics, high capacity, and high energy density, and thus is currently widely used in mobile phones, laptop computers, storage batteries for power generating units using wind power or sunlight, electric vehicles, uninterruptable power supplies (UPS), household storage batteries, and the like.

FIGS. 2A to 2D are schematic views illustrating structures of lithium secondary batteries having the electrolytes according to embodiments of the present disclosure.

Figure 2A:
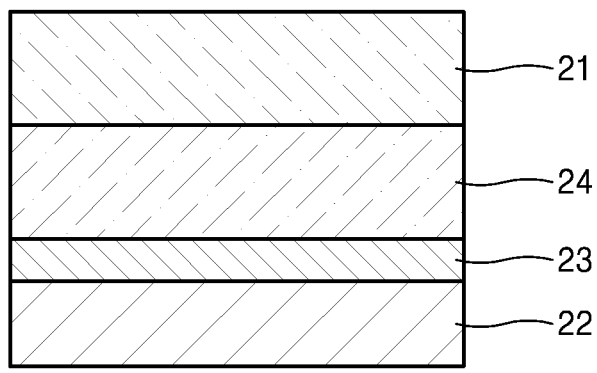
FIGS. 2A to 2D are schematic views illustrating structures of lithium secondary batteries according to embodiments of the present disclosure.

Referring to FIG. 2A, a lithium secondary battery according to an embodiment may have a structure including an electrolyte 23 according to the above-described embodiments between a cathode 21 and an anode 22. The lithium secondary battery may further include an intermediate layer 24 between the electrolyte 23 and the cathode 21. The intermediate layer 24 may further include at least one selected from a liquid electrolyte, a polymer ionic liquid, a solid electrolyte, and a gel electrolyte, each having a different composition from the electrolyte 23, and a separator.

Since the electrolyte 23 is disposed on at least part of a surface of the anode 22, the surface of the anode 22 may be mechanically and electrochemically stable. According, dendrite growth on the surface of the anode during charging and discharging of the lithium secondary battery may be suppressed, and interfacial stability between the anode 22 and the electrolyte 23 may be improved, thus improving cycle characteristics of the lithium secondary battery.

The electrolyte 23 may serve as a protective layer for the surface of the anode 22 when it coats the surface of the anode 22. For example, the electrolyte 23 may prevent an electrolyte having high reactivity to the anode from directly contacting the surface of the anode 22 that is highly reactive to the electrolyte 23. Accordingly, the electrolyte 23 may protect the anode 22, improving the stability of the anode 22.

Figure 2B:
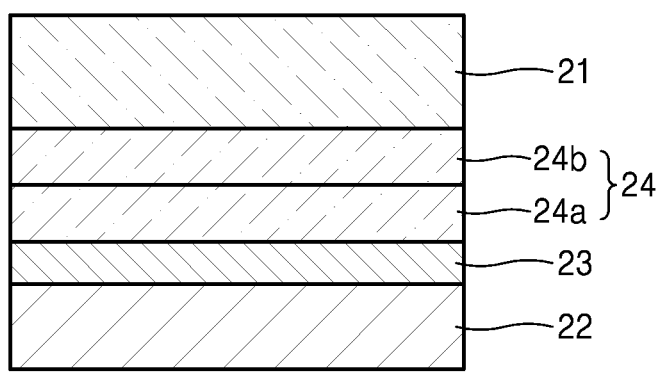

The intermediate layer 24 may have a two-layer structure including a liquid electrolyte 24a and a solid electrolyte 24b that are sequentially disposed upon one another, as illustrated in FIG. 2B. The liquid electrolyte 24a may be disposed adjacent to the electrolyte 23. The lithium secondary battery may have a stack structure of anode/electrolyte/intermediate layer(liquid electrolyte/solid electrolyte)/cathode.

Figure 2C:
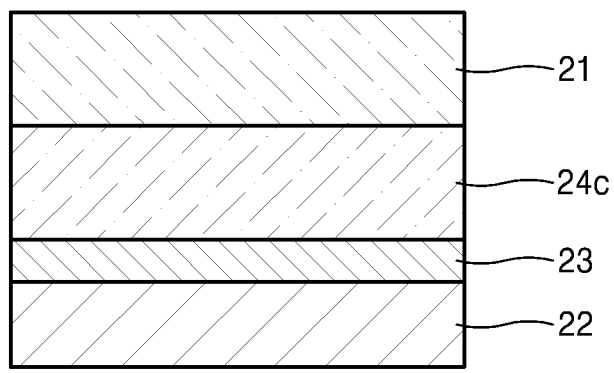

Referring to FIG. 2C, a lithium secondary battery according to another embodiment may include a separator 24c as an intermediate layer. The separator 24c may be a monolayer or a multilayer including at least two layers of polyethylene, polypropylene, polyvinylidene fluoride, or a combination thereof. For example, the separator 24c may be a mixed multilayer, such as a 2-layer separator of polyethylene/polypropylene, a 3-layer separator of polyethylene/polypropylene/polyethylene, or a 3-layer separator of polypropylene/polyethylene/polypropylene.

Figure 2D:
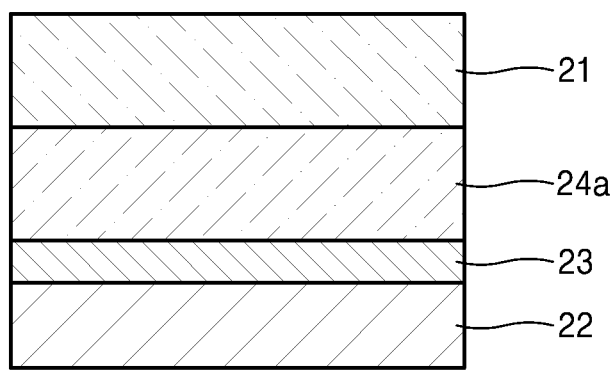

A lithium secondary battery according to another embodiment may include a liquid electrolyte 24a as an intermediate layer, as illustrated in FIG. 2D. The liquid electrolyte 24a may have the same or different composition from a liquid electrolyte that the electrolyte 23 may include.

In FIGS. 2A to 2D, the cathode 21 may be a porous cathode. The porous cathode may be a cathode including pores, or any cathode that allows permeation of liquid electrolyte thereinto by capillary action.

For example, the porous cathode may be a cathode obtained by coating a cathode active material composition including a cathode active material, a conducting agent, a binder, and a solvent, followed by drying. The resulting cathode may include pores among particles of the cathode active material. The porous cathode may be impregnated with liquid electrolyte.

In some embodiments, the cathode 21 may include a liquid electrolyte, a gel electrolyte, a solid electrolyte, or the like. The liquid electrolyte, the gel electrolyte, and the solid electrolyte may be any electrolyte available for lithium secondary batteries in the art that does not react with the cathode active material to deteriorate the same during charging and discharging.

In FIGS. 2A to 2E, the anode 22 may be a lithium metal thin film. The lithium metal thin film may have a thickness of less than about 100 micrometers ($\mu m$). While not wishing to be bound by a theory, it is believed that when the thickness of the lithium metal thin film is less than about 100 $\mu m$, the lithium secondary battery may have stable cycle characteristics. For example, the lithium metal thin film of the lithium secondary battery may have a thickness of about 80 $\mu m$ or less, and in some embodiments, about 60 $\mu m$ or less, and in some other embodiments, about 0.1 $\mu m$ to about 60 $\mu m$. The drawback of the prior art is—when such a lithium metal thin film has a thickness of less than 100 $\mu m$, it is difficult to implement a lithium secondary battery with stable cycle characteristics since the thickness of the lithium metal thin film may be reduced due to a side reaction, dendrite formation, or the like. However, a lithium secondary battery with stable cycle characteristics may be manufactured using any of the electrolytes according to the above-described embodiments.

Figure 3:
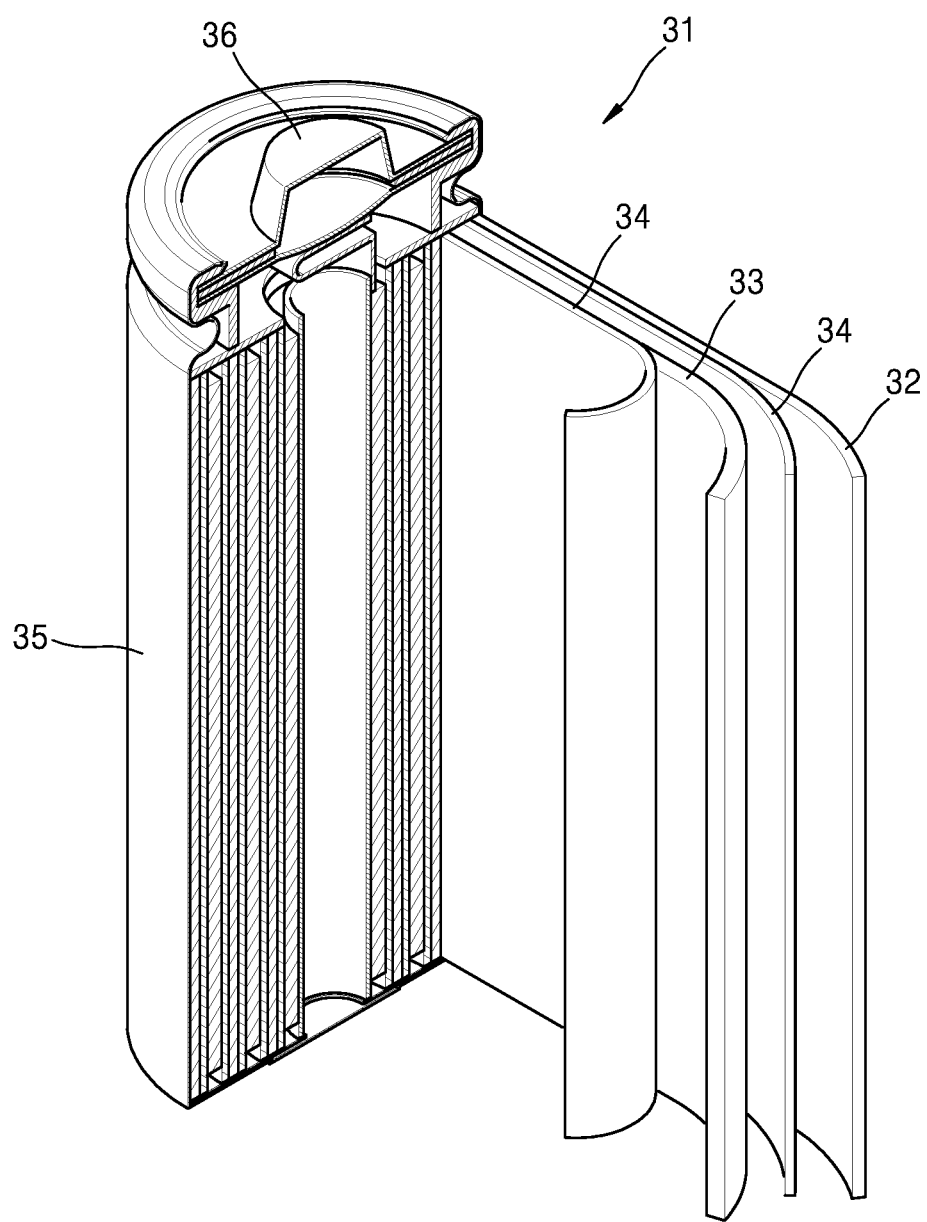
FIG. 3 is an exploded perspective view of a lithium secondary battery according to an embodiment of the present disclosure.

FIG. 3 is an exploded perspective view of a structure of a lithium secondary battery 31 according to an embodiment.

Referring to FIG. 3, the lithium secondary battery 31 may include a cathode 33, an anode 32, and an electrolyte 34 according to an embodiment. The cathode 33, the anode 32, and the electrolyte 34 may be rolled or folded and then be accommodated in a battery case 35, followed by injecting a liquid electrolyte into the battery case 35 and sealing with a cap assembly 36, thereby completing manufacture of the lithium secondary battery 31. The battery case 35 may be a cylindrical, rectangular, or thin-film type. For example, the lithium secondary battery may be a large thin-film battery.

A separator (not shown) may be further disposed between the cathode 33 and anode 32 to form an electrode assembly. The electrode assembly may be stacked on another electrode assembly to form a bicell structure, which may then be impregnated with a liquid electrolyte. The resultant may be accommodated in a pouch and then sealed, thereby completing the manufacture of a lithium secondary battery.

In some embodiments, a plurality of such electrode assemblies may be stacked upon one another to form a battery pack. The battery pack may be applicable in any device that needs a high capacity, for example, a laptop computer, a smart phone, an electric vehicle, or the like.

The lithium secondary battery may be, for example, a lithium air battery, a lithium sulfur battery, or the like.

According to another aspect of the present disclosure, a lithium secondary battery may include: a cathode, an anode, and any of the electrolytes according to the above-described embodiments, wherein the anode is a lithium metal or lithium metal alloy electrode. For example, the lithium secondary battery may be a lithium metal battery.

The lithium secondary battery may further include at least one selected from a liquid electrolyte, a gel electrolyte, a polymer electrolyte, a polymer ionic liquid, and a separator between the electrolyte and the anode.

The electrolyte may serve as a protective layer for the lithium metal or lithium metal alloy electrode. The electrolyte may perform its own function with improved mechanical properties, without any organic solvent such as a carbonate solvent. When the electrolyte is disposed on a surface of the lithium anode, dendritic growth on the surface of the anode after charging and discharging, and a short circuit that may occur due to cracking of the electrolyte may both be effectively suppressed due to improved interfacial characteristics between the electrolyte and the lithium metal. The electrolyte may also be stable against a liquid electrolyte.

In some embodiments, the lithium secondary battery may have an operation voltage of about 4.0 V to about 5.0 V, for example, about 4.5 V to about 5.0 V.

In some embodiments, the lithium secondary battery may further include at least one selected from a liquid electrolyte, a polymer ionic liquid, a solid electrolyte, and a gel electrolyte between the cathode and the electrolyte.

Each of the components of the lithium secondary battery including any of the electrolytes according to the above-described embodiments, and a method of manufacturing a lithium secondary battery including such components will be described in greater detail.

A cathode active material for the cathode may include at least one selected from lithium cobalt oxide, lithium nickel cobalt manganese oxide, lithium nickel cobalt aluminum oxide, lithium iron phosphate, and lithium manganese oxide, but is not limited thereto. Any cathode active material available in the art may be used.

For example, the cathode active material may be a compound represented by one of the following formulae: $Li_aA_{1-b}B'_bD'_2$ (wherein $0.90 \le a \le 1.8$, and $0 \le b \le 0.5$(; $Li_aE_{1-b}B'_bO_{2-c}D'_c$ (wherein $0.90 \le a \le 1.8$, $0 \le b \le 0.5$, and $0 \le c \le 0.05$(; $LiE_{2-b}B'_bO_{4-c}D'c$ (wherein $0 \le b \le 0.5$, and $0 \le c \le 0.05$); $Li_aNi_{1-b-c}Co_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F_2$ (wherein $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cO_{2-\alpha}F_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae above, A is selected from nickel (Ni), cobalt (Co), manganese (Mn), and combinations thereof; B' is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

For example, the cathode active material may be a compound represented by Formula 12, a compound represented by Formula 13, or a compound represented by Formula 14.

$$Li_aNi_bCo_cMn_dO_2 \quad \text{Formula 12}$$

In Formula 12, $0.90 \le a \le 1.8$, $0 \le b \le 0.9$, $0 \le c \le 0.5$, and $0 \le d \le 0.5$.

$$Li_2MnO_3 \quad \text{Formula 13}$$

$$LiMO_2 \quad \text{Formula 14}$$

In Formula 14, M may be Mn, Fe, Co, or Ni.

The cathode of the lithium secondary battery may be manufactured as follows.

A cathode active material, a binder, and a solvent are mixed to prepare a cathode active material composition. A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The current collector may be a metal such as nickel, aluminum, titanium, copper, gold, silver, platinum, an aluminum alloy, or stainless steel, a film prepared by plasma-spraying or arc-spraying a carbonaceous material, activated carbon fiber, nickel, aluminum, zinc, copper, tin, lead, and any alloy thereof, or a conductive film prepared by dispersing a conductive material in a rubber or a resin such as styrene-ethylene-butylene-styrene copolymer (SEBS). For example, aluminum, nickel, or stainless steel may be used. Aluminum may be used since it can be easily processed into a thin film and is inexpensive. A shape of the current collector is not particularly limited. For example, the current collector may have a thin film shape, a flat plate shape, a mesh shape, a net shape, a punched shape, an embossing shape, or any combination thereof, e.g. a mesh shape flat plate or the like. For example, the current collector may have an uneven surface formed by etching.

The binder is a composition that contributes binding with an active material and a conductive material and binding with a current collector, and thus an amount of the binder added is from about 1 part to about 50 parts by weight based on 100 parts by weight based on the total weight of the positive electrode active material. Examples of the binder include polyvinylidene fluoride (PVDF), polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, and various copolymers. A content of the binder is from about 2 parts to about 5 parts by weight based on 100 parts by weight of the total weight of the positive electrode active material. When a content of the binder is within this range, a binding force of the active material layer with respect to the current collector is satisfactory.

The conductive agent may be any material that does not cause chemical change in the battery and have conductivity, and examples of the conductive agent include graphite such as natural graphite or artificial graphite; carbon blacks, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whisky, such as zinc oxide or potassium titanate; a conductive metal oxide, such as a titanium oxide; and a conductive material, such as a polyphenylene derivative.

A content of the conducting agent may be from about 1 parts to about 10 parts by weight for example, from about 1 parts to about 5 parts by weight based on 100 parts by weight of the total weight of the positive electrode active material. When a content of the conducting agent is within this range, the finally obtained electrode may have excellent conductivity characteristic.

Examples of the solvent include N-methylpyrrolidone.

A content of the solvent is from about 100 parts to about 2000 parts by weight based on 100 parts by weight of the positive electrode active material. When a content of the solvent is within this range, a process for forming the active material layer may be easily carried out.

If desired, a plasticizer may be further added into the cathode active material composition and/or the anode active material composition to form electrode plates including pores. The amounts of the cathode active material, the conducting agent, the binder, and the solvent may be those levels that are generally used in lithium secondary batteries in the art. At least one of the conducting agent and the solvent may not be used depending on the use and the structure of the lithium secondary battery.

The anode of the lithium secondary battery may be manufactured in a substantially same manner as in the manufacture of the cathode, except for using an anode active material instead of the cathode active material.

The anode active material may be a carbonaceous material, silicon, a silicon oxide, a silicon alloy, a silicon-carbonaceous material composite, tin, a tin alloy, a tin-carbon composite, a metal oxide, or a combination thereof. The carbonaceous material may be crystalline carbon, amorphous carbon, or a mixture thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, meso-phase pitch carbides, sintered corks, graphene, carbon black, fullerene soot, carbon nanotubes, and carbon fibers. Any appropriate material available in the art may be used.

The anode active material may be selected from Si, $SiO_x$ (where $0<x<2$, for example, $0.5<x<1.5$), Sn, $SnO_2$, a silicon-containing metal alloy, and a mixture thereof. A metal that is alloyable with silicon may be at least one selected from Al, Sn, Ag, Fe, Bi, Mg, Zn, In, Ge, Pb, and Ti.

The anode active material may include a metal/metalloid alloyable with lithium, an alloy thereof, or an oxide thereof. Examples of the metal/metalloid alloyable with lithium, an alloy thereof, or an oxide thereof are Si, Sn, Al, Ge, Pb, Bi, Sb, Si—Y alloy (wherein Y is an alkali metal, an alkali earth metal, a Group XIII element, a Group XIV element, a transition metal, a rare earth element, or a combination thereof except for Si), a Sn—Y alloy (wherein Y is an alkali metal, an alkali earth metal, a Group XIII element, a Group XIV element, a transition metal, a rare earth element, or a combination thereof except for Sn), and $MnO_x$ (wherein $0<x\leq2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, and a lithium vanadium oxide, $SnO_2$, and $SiO_x$ (wherein $0<x<2$).

For example, the anode may be a lithium metal thin film.

The amounts of the anode active material, the conducting agent, the binder, and the solvent may be the amounts that are generally used in the manufacture of lithium secondary batteries in the art.

For example, the lithium secondary battery may further include a separator and/or a lithium salt-containing non-aqueous electrolyte that are in common use in lithium secondary batteries in the art, in addition to the electrolyte according to any of the above-described embodiments.

The separator may be an insulating thin film having high ion permeability and high mechanical strength. The separator may have a pore diameter of about 0.01 μm to about 10 μm, and a thickness of about 5 μm to about 20 μm. Examples of the separator are olefin polymers, such as polypropylene, and sheets or non-woven fabric made of glass fiber or polyethylene. When the electrolyte of the lithium battery is a solid polymer electrolyte, the solid polymer electrolyte may also serve as a separator.

The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

For example, the lithium salt may be $LiPF_6$, $LiBF_4$, $LiSbF_6$, $LiAsF_6$, $LiClO_4$, $LiCF_3SO_3$, $LiN(CF_3SO_2)_2$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

To improve charge-discharge characteristics and resistance to flame, pyridine, triethylphosphate, triethanolamine, cyclic ether, ethylene diamine, n-glyme, hexamethyl phosphoramide, nitrobenzene derivative, sulfur, quinone imine dye, N-substituted oxazolidinone, N, N-substituted imidazolidine, ethylene glycol dialkyl ether, ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if desired.

In some embodiments, the lithium secondary battery may have improved capacity and improved lifetime characteristics, and thus may be used in a battery cell as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group. Non-limiting examples of the "alkyl" group are methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amido group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" indicates fluorine, bromine, chlorine, iodine, and the like.

As used herein, the term "alkenyl" group indicates a branched or unbranched hydrocarbon group with at least one carbon-carbon double bond. Non-limiting examples of the alkenyl group are vinyl, allyl, butenyl, isopropenyl, and isobutenyl. At least one hydrogen atom in the alkenyl group may be substituted with any of the substituents listed for the alkyl group above.

As used herein, the term "alkynyl" indicates a branched or unbranched hydrocarbon group with at least one carbon-carbon triple bond. Non-limiting examples of the "alkynyl" group are ethynyl, butynyl, isobutynyl, and isopropynyl. At least one hydrogen atom of the "alkynyl" group may be substituted with any of the substituents listed for the alkyl group above.

The term "aryl" is construed as including a group with an aromatic ring optionally fused to at least one carbocyclic ring. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or aromatic group including at least one heteroatom selected from among nitrogen (N), oxygen (O), phosphorous (P), and sulfur (S) in a ring, wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" indicates a heteroaromatic ring fused to at least one of an aryl group, a cycloaliphatic group, and a heterocyclic group.

As used herein, the term "carbocyclic" group indicates a saturated or partially unsaturated non-aromatic monocyclic, bicyclic or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo[2.2.1]heptyl, bicyclo[2.2.1]heptenyl, or bicyclo[2.2.2]octyl A non-limiting example of the tricyclic hydrocarbon is adamantyl.

As used herein, the term "heterocyclic" group indicates a C5-20 cyclic hydrocarbon group, for example, C5-C10 cyclic hydrocarbon group, including at least one hetero atom. For example, the at least one hetero atom is selected from S, N, O, and B.

As used herein, the terms "alkoxy", "aryloxy", and "heteroaryloxy" indicates alkyl, aryl, and heteroaryl, respectively, each bound to an oxygen atom.

Hereinafter, one or more embodiments of the present disclosure will be described in detail with reference to the following examples. However, these examples are illustrative only and are not intended to limit the scope of the one or more embodiments of the present disclosure.

Example 1: Preparation of Electrolyte

A polystyrene-b-polyethylene oxide-b-polystyrene block copolymer (available from Polymer Source) was added to anhydrous tetrahydrofuran to obtain a 5 percent by weight (wt %)—block copolymer-including mixture. The block copolymer of the block copolymer-including mixture included a polystyrene block, a polyethylene oxide block, and a polystyrene block in a ratio of about 10:36:10 by weight, and had a weight average molecular weight of about 56,000 Daltons (Da).

Lithium bistrifluoromethanesulfonimide (LiTFSI), polyethylene glycol diacrylate (having a weight average molecular weight of about 250), and 2-hydroxy-2-methyl-1-phenyl propan-1-one (HMPP) were added to the block copolymer-including mixture to obtain an electrolyte composition. The amount of LiTFSI was adjusted to provide a mole ratio of about 20:1 of ethylene oxide in the block copolymer to lithium ions in LiTFSI. The amount of HMPP was about 2 parts by weight based on 100 parts by weight of the polystyrene-b-polyethylene oxide-b-polystyrene block copolymer. The amount of polyethylene glycol diacrylate was about 20 parts by weight based on 100 parts by weight of the polystyrene-b-polyethylene oxide-b-polystyrene block copolymer.

The electrolyte composition was coated on a substrate with a doctor blade, dried at about 40° C. for about 1 hour, and irradiated with ultraviolet (UV) rays for about 10 minutes to form an electrolyte in membrane form. The electrolyte had a thickness of about 40 micrometers (μm).

Example 2: Preparation of Electrolyte

An electrolyte was prepared in the same manner as in Example 1, except that methacryloxypropyl heptaisobutyl-t8-silsesquioxane (available from Gelest) represented by Formula 2 was further added to the block copolymer-including mixture to prepare the electrolyte composition. The amount of methacryloxypropyl heptaisobutyl-t8-silsesquioxane was about 7.5 parts by weight based on 100 parts by weight of the polystyrene-b-polyethylene oxide-b-polystyrene block copolymer.

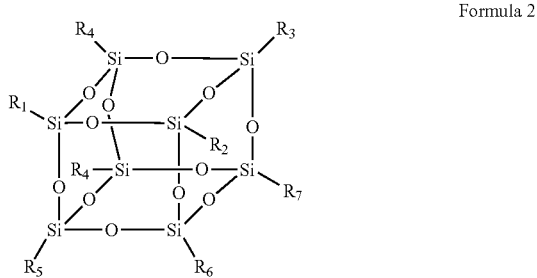

Formula 2

In Formula 2, $R_1$ to $R_7$ are isobutyl groups, and $R_8$ is a methacryloxypropyl group.

Example 3: Preparation of Electrolyte

An electrolyte was prepared in the same manner as in Example 1, except that a block copolymer having a mixed weight ratio of about 12:59:12 of a styrene unit, an ethylene oxide unit, and a styrene unit was used as the polystyrene-b-polyethylene oxide-b-polystyrene block copolymer.

Example 4: Preparation of Electrolyte

An electrolyte was prepared in the same manner as in Example 1, except that an ionic liquid represented by Formula 5 was further added. The amount of the ionic liquid was about 20 parts by weight based on 100 parts by weight of the polystyrene-b-polyethylene oxide-b-polystyrene block copolymer.

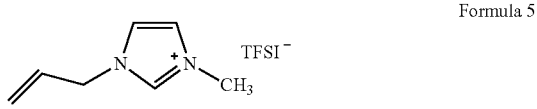

Formula 5

TFSI=bis(trifluoromethylsulfonyl)imide)

Example 5: Preparation of Electrolyte

An electrolyte was prepared in the same manner as in Example 1, except that the amount of polyethylene glycol diacrylate was varied to about 5 parts by weight based on 100 parts by weight of the polystyrene-b-polyethylene oxide-b-polystyrene block copolymer

Example 6: Preparation of Electrolyte

An electrolyte was prepared in the same manner as in Example 1, except that the amount of polyethylene glycol diacrylate was varied to about 50 parts by weight based on 100 parts by weight of the polystyrene-b-polyethylene oxide-b-polystyrene block copolymer

Example 7: Preparation of Electrolyte

An electrolyte was prepared in the same manner as in Example 1, except that ethyl acrylate was further added to prepare the electrolyte composition. The amount of ethyl acrylate was about 20 parts by weight based on 100 parts by weight of the polystyrene-b-polyethylene oxide-b-polystyrene block copolymer.

Example 8: Preparation of Electrolyte

An electrolyte was prepared in the same manner as in Example 1, except that ethoxylated trimethylolpropane triacrylate (ETPTA) instead of polyethylene glycol diacrylate was used to prepare the electrolyte composition.

Comparative Example 1: Preparation of Electrolyte

An electrolyte was prepared in the same manner as in Example 1, except that the electrolyte composition was prepared without adding polyethylene glycol diacrylate and UV irradiation.

Comparative Example 2: Preparation of Electrolyte

An electrolyte was prepared in the same manner as in Example 3, except that the electrolyte composition was prepared without adding polyethylene glycol diacrylate.

Manufacture Example 1: Manufacture of Lithium Secondary Battery (Full Cell)

The electrolyte composition of Example 1 was coated on a lithium metal thin film (having a thickness of about 20 μm) by using a doctor blade to a thickness of about 8 μm, dried at about 25° C., and then thermally treated at about 120° C. in a vacuum to manufacture a lithium metal anode with an electrolyte.

$LiCoO_2$, a conducting agent (Super-P, available from Timcal Ltd.), polyvinylidene fluoride (PVdF), and N-methylpyrrolidone were mixed together to obtain a cathode composition. A mixed weight ratio of $LiCoO_2$, the conducting agent, and PVdF in the cathode composition was about 97:1.5:1.5.

The cathode composition was coated on an aluminum foil (having a thickness of about 15 μm), dried at about 25° C., and then further thermally treated at about 110° C. in a vacuum to manufacture a cathode.

The cathode was assembled with the lithium metal anode having the electrolyte in such a way that the electrolyte was disposed between the cathode and the lithium metal anode, thereby manufacturing a lithium secondary battery. A liquid electrolyte was added between the anode and the electrolyte. The liquid electrolyte was obtained by adding $LiPF_6$ lithium salt into a mixed solvent of ethylene carbonate (EC), diethyl carbonate (DEC), and fluoroethylene carbonate (FEC) in a volume ratio of about 2:6:2 such as to prepare a 1.3 molar (M) solution.

Manufacture Examples 2 to 8: Manufacture of Lithium Secondary Battery (Full Cell)

Lithium secondary batteries were manufactured in the same manner as in Manufacture Example 1, except that the electrolyte compositions of Examples 2 to 8, instead of the electrolyte composition of Example 1, were used, respectively.

Comparative Manufacture Examples 1 and 2: Manufacture of Lithium Secondary Battery (Full Cell)

Lithium secondary batteries were manufactured in the same manner as in Manufacture Example 1, except that the electrolytes of Comparative Examples 1 and 2, instead of the electrolyte composition of Example 1, were used, respectively.

Comparative Manufacture Example 3: Manufacture of Lithium Secondary Battery (Full Cell)

LiCoO$_2$, a conducting agent (Super-P, available from Timcal Ltd.), polyvinylidene fluoride (PVdF), and N-methylpyrrolidone were mixed together to obtain an cathode composition. A mixed weight ratio of LiCoO$_2$, the conducting agent, and PVdF in the cathode composition was about 97:1.5:1.5.

The cathode composition was coated on an aluminum foil (having a thickness of about 15 μm), dried at about 25° C., and then further thermally treated at about 110° C. in a vacuum to manufacture a cathode.

A lithium secondary battery (full cell) was manufactured using the cathode, a lithium metal thin film anode (having a thickness of about 20 μm), a polypropylene separator (Celgard 3510) disposed between the cathode and the lithium metal thin film anode, and an electrolyte as a solution of 1.3 M LiPF$_6$ dissolved in a mixed solvent of ethylene carbonate (EC), diethyl carbonate (DEC), and fluoroethylene carbonate (FEC) in a volume ratio of about 2:6:2.

Evaluation Example 1: X-Ray Diffraction (XRD) Analysis

The electrolytes of Examples 1 and 2 and Comparative Example 1 were analyzed by X-ray diffraction analysis using a Rigaku RINT2200HF+ diffractometer with CuK-α radiation (1.540598 Angstroms (Å)). The X-ray diffraction analysis results of the electrolytes of Examples 1 and 2 and Comparative Example 1 are shown in FIGS. 4 to 6, respectively, and Table 1.

Figure 4:
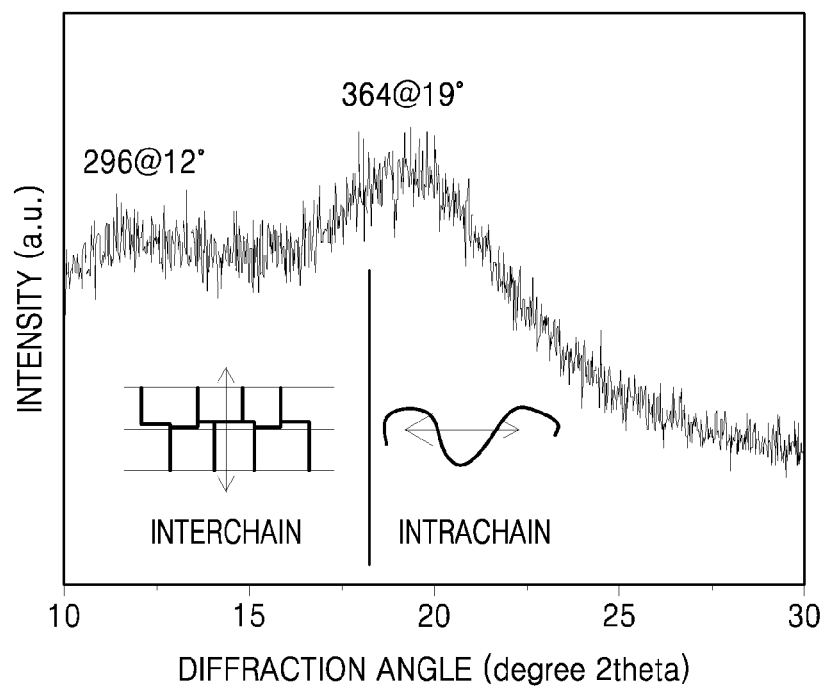
FIGS. 4 to 6 are graphs of intensity (arbitrary units, a. u.) versus diffraction angle (degrees two theta (2θ)) illustrating the results of X-ray diffraction analysis of the electrolytes of Examples 1 and 2 and Comparative Example 1.
Figure 5:
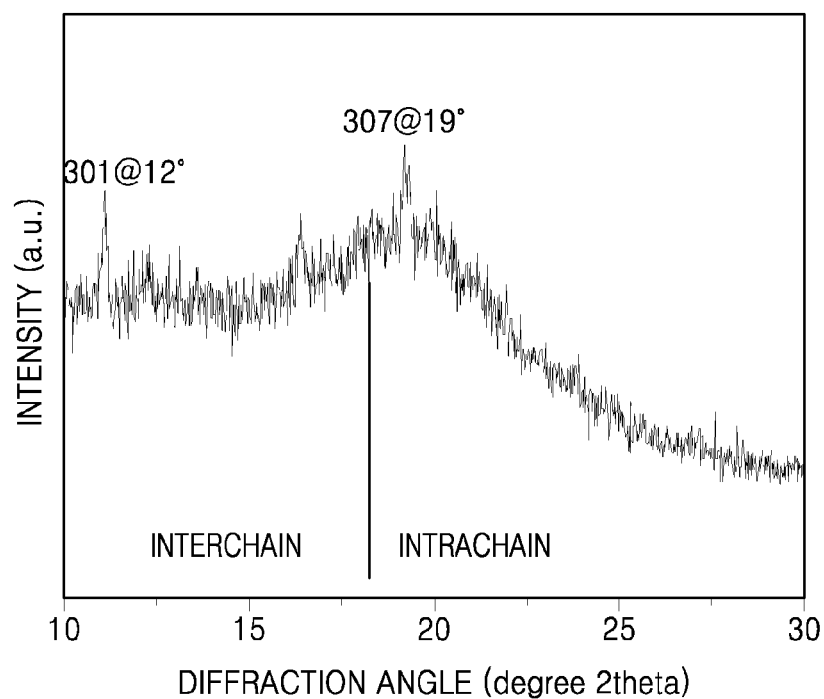
Figure 6:
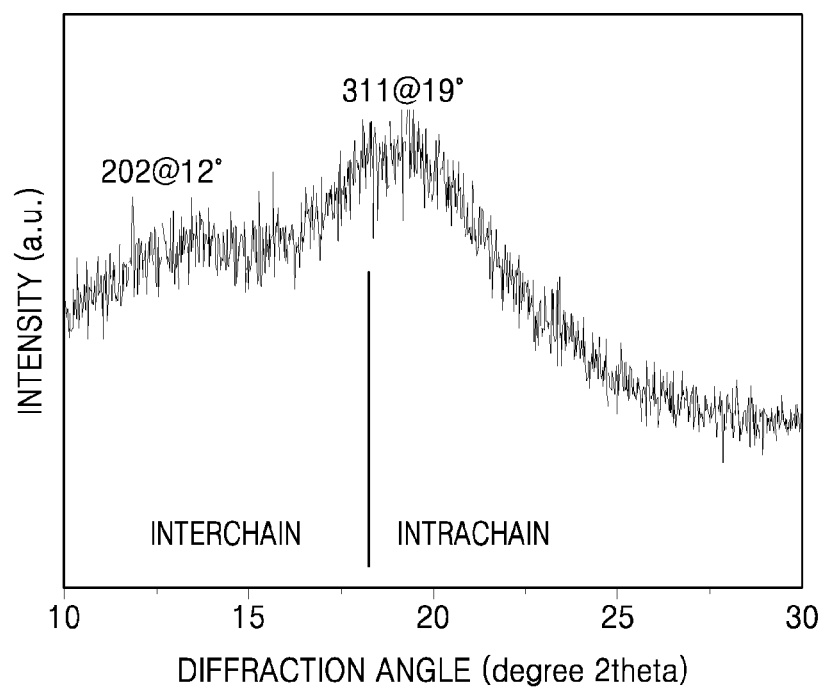

Referring to FIGS. 4 and 6, a peak P$_A$ at a diffraction angle 2θ of about 12° and a peak P$_B$ at a diffraction angle 2θ of about 19° both appeared in the electrolytes of Example 1 and Comparative Example 1. The peak P$_A$ at a 2θ of about 12° provides information about interchain crystallinity in the polyethylene oxide (PEO) block of the polystyrene-b-polyethylene oxide-b-polystyrene block copolymer, and the peak P$_B$ at a 2θ of about 19° provides information about intrachain crystallinity in the PEO block of the polystyrene-b-polyethylene oxide-b-polystyrene block copolymer.

TABLE 1

|  | Example 1 | Example 2 | Comparative Example 1 |
|---|---|---|---|
| Peak P$_A$ | 296 | 301 | 202 |
| Peak P$_B$ | 364 | 307 | 311 |
| I (P$_B$)/I (P$_A$) | 1.23 | 1.02 | 1.54 |

In Table 1, I (P$_B$) indicates the intensity of the peak P$_B$, and I (P$_A$) indicates the intensity of the peak P$_A$.

Referring to Table 1 and FIGS. 4 to 6, the electrolytes of Examples 1 and 2 were found to have reduced intrachain crystallinity and increased interchain crystallinity in the PEO block of the polystyrene-b-polyethylene oxide-b-polystyrene block copolymer with crosslinking reaction by UV irradiation, compared to the electrolyte of Comparative Example 1, and consequently had an increased PEO domain size due to the crosslinking in the PEO domain.

Evaluation Example 2: Differential Scanning Calorimetry (DSC)

Figure 7:
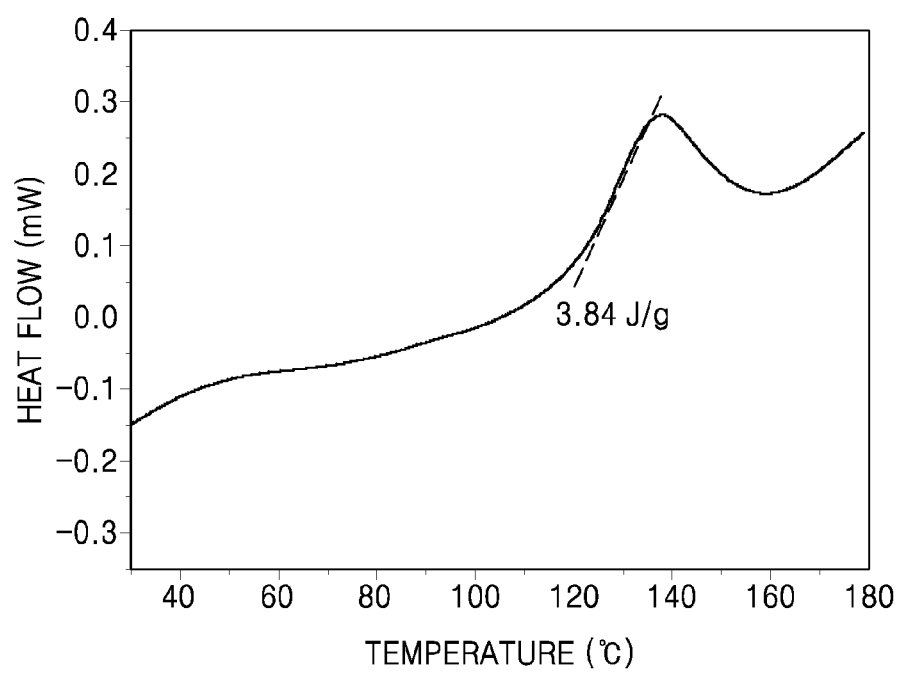
FIGS. 7 to 9 are graphs of heat flow (milli Watts, mW) versus temperature (degrees Centigrade, °C.) illustrating the results of analysis of the electrolytes prepared according to Examples 1 and 2 and Comparative Example 1 by differential scanning calorimetry (DSC)
Figure 8:
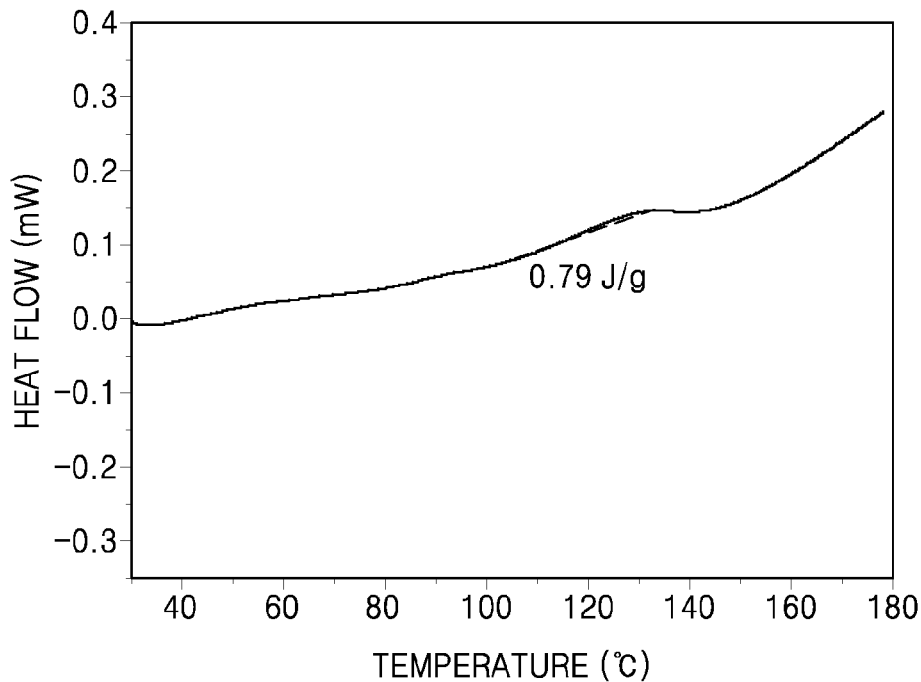
Figure 9:
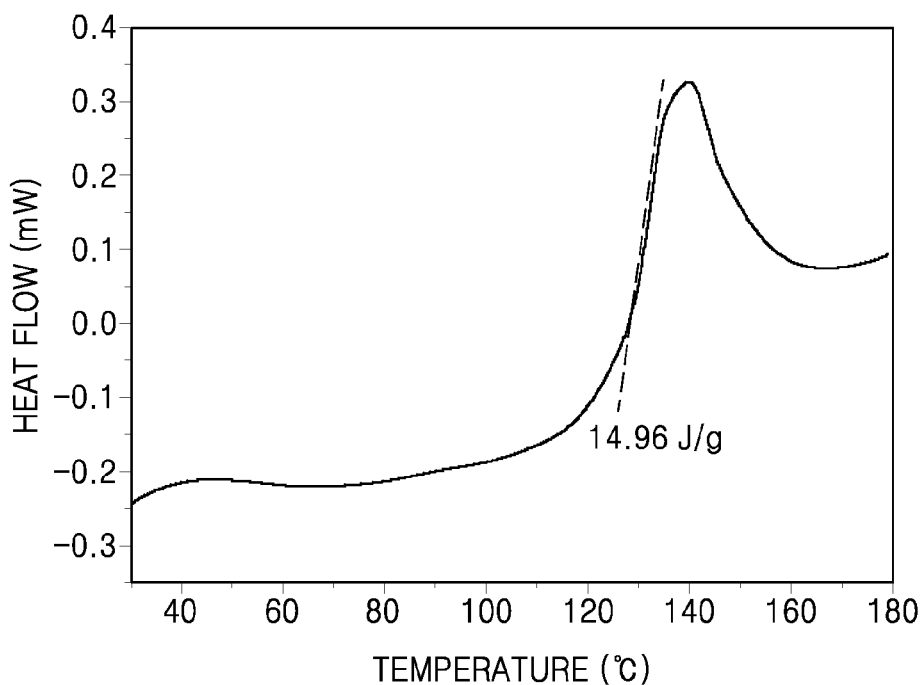

The electrolytes of Examples 1 and 2 and Comparative Example 1 were analyzed by differential scanning calorimetry (DSC) using a TA Q2000 differential scanning calorimeter (available from TA Instruments), and the DSC results thereof are shown in FIGS. 7 to 9, respectively.

Referring to FIGS. 7 to 9, the electrolytes of Example 1 and Example 2 were found to yield a lower heat flow compared to the electrolyte of Comparative Example 1, indicating that there occurred crosslinking of polyethylene glycol diacrylate in the ion-conductive domain of the electrolytes of Examples 1 and 2 by UV irradiation.

Evaluation Example 3: Impedance Measurement

Impedance measurements were performed on the lithium secondary batteries (full cells) of Manufacture Examples 1 and 2 and Comparative Manufacture Examples 1 and 3 by using a Solartron 1260A Impedance/Gain-Phase Analyzer) by a 2-probe method in a frequency range of about 0.1 Hertz (Hz) to about 1 mega Hertz (MHz) and an amplitude of about ±10 mV (milli Volts).

Figure 10:
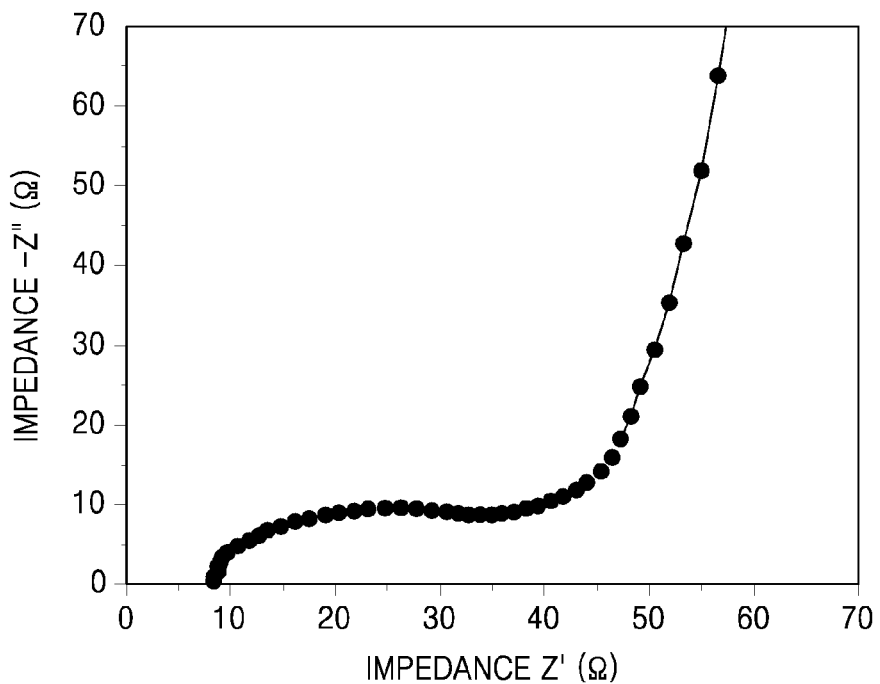
FIGS. 10 to 12 are graphs of impedance −Z" (Ohms, Ω) versus impedance Z' (Ohms, Ω) illustrating the results of impedance analysis on lithium secondary batteries prepared according to Manufacture Examples 1 and 2 and Comparative Manufacture Examples 1 and 3.
Figure 11:
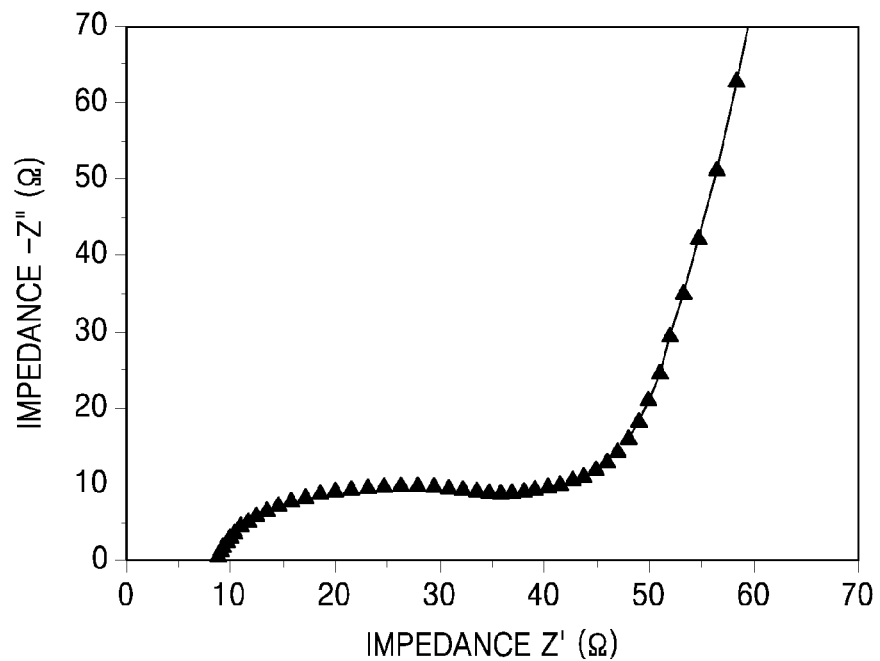
Figure 12:
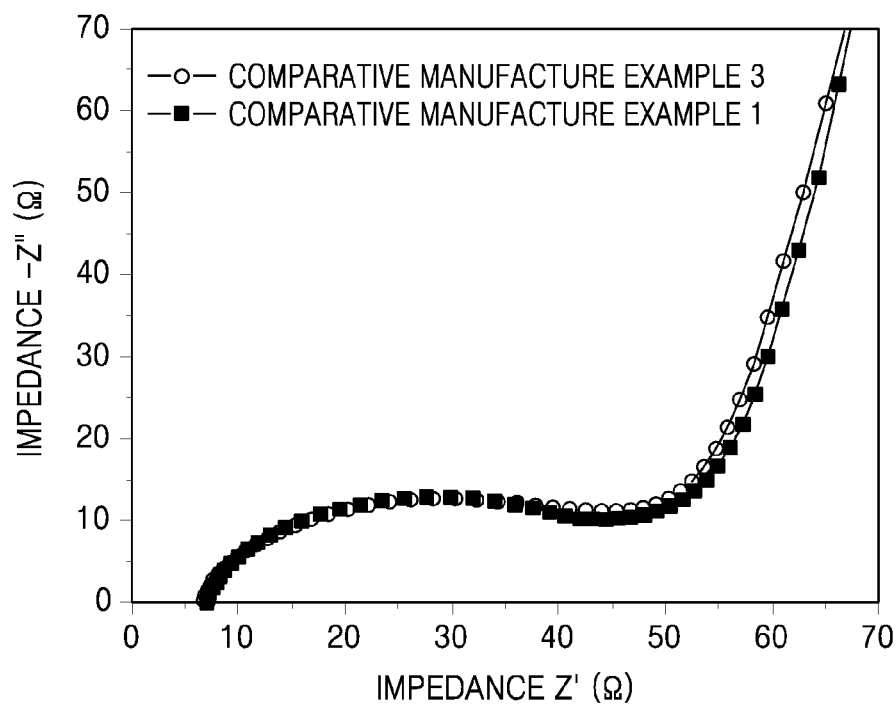

Nyquist plots obtained from the impedance measurements performed after 24 hours from the manufacture of the lithium secondary batteries (full cells) of Manufacture Examples 1 and 2 and Comparative Manufacture Examples 1 and 3 are shown in FIGS. 10 to 12. In FIGS. 10 to 12, an interfacial resistance between the electrode and the electrolyte is dependent from the positions and sizes of the semicircles. Analysis results of the Nyquist plots of FIGS. 10 to 12 are shown in Table 2.

TABLE 2

| Example | Interfacial resistance (R$_i$) (ohm) |
|---|---|
| Manufacture Example 1 | 28 |
| Manufacture Example 2 | 30 |
| Comparative Manufacture Example 1 | 40 |
| Comparative Manufacture Example 3 | 39 |

Referring to Table 2 and FIGS. 10 to 12, the lithium secondary batteries of Manufacture Example 1 and Manufacture Example 2 were found to have remarkably low interfacial resistances, compared to those of the lithium secondary batteries of Comparative Manufacture Example 1 and Comparative Manufacture Example 3.

Evaluation Example 4: Charge-Discharge Characteristic Evaluation

Each of the lithium secondary batteries of Manufacture Examples 1 to 8 and Comparative Manufacture Examples 1 and 3 was charged at room temperature (25° C.) at a constant current (0.2 C) to a cut-off voltage of about 4.4 V with respect to lithium metal and charged at a constant voltage of about 4.4 V to a cut-off current of about 0.72 milli Amperes (mA), and then discharged at a constant current of 0.2 C to a cut-off voltage of about 3.0 V. This charge-discharge cycle was repeated 80 times.

Capacity retention rates of the lithium secondary batteries of Manufacture Examples 1 to 8 and Comparative Manufacture Examples 1 and 3 at 50$^{th}$ and 80$^{th}$ charge-discharge cycles were calculated using Equations 1 and 2, respectively. Some of the results are shown in Table 3.

Capacity retention rate (%)=(50$^{th}$ cycle discharge capacity/1$^{st}$ cycle discharge capacity)×100   Equation 1

Capacity retention rate (%)=(80$^{th}$ cycle discharge capacity/1$^{st}$ cycle discharge capacity)×100

Figure 13:
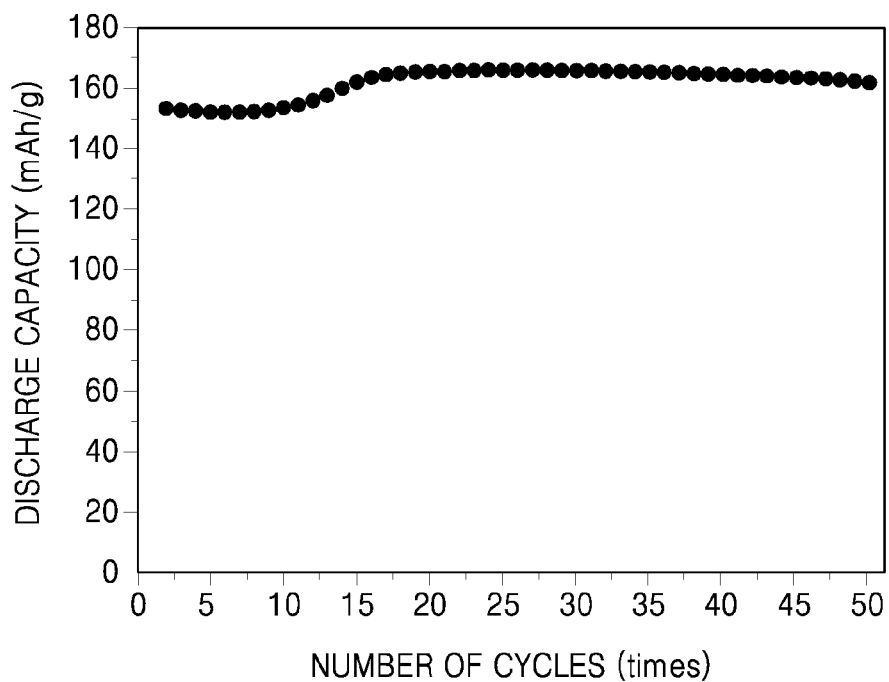
FIGS. 13 to 15 are graphs of discharge capacity (milli Ampere hours per gram, mAh/g) versus number of cycles illustrating the results of charge-discharge characteristic evaluation of the lithium secondary batteries prepared according to Manufacture Examples 1 and 2 and Comparative Manufacture Examples 1 and 3.
Figure 14:
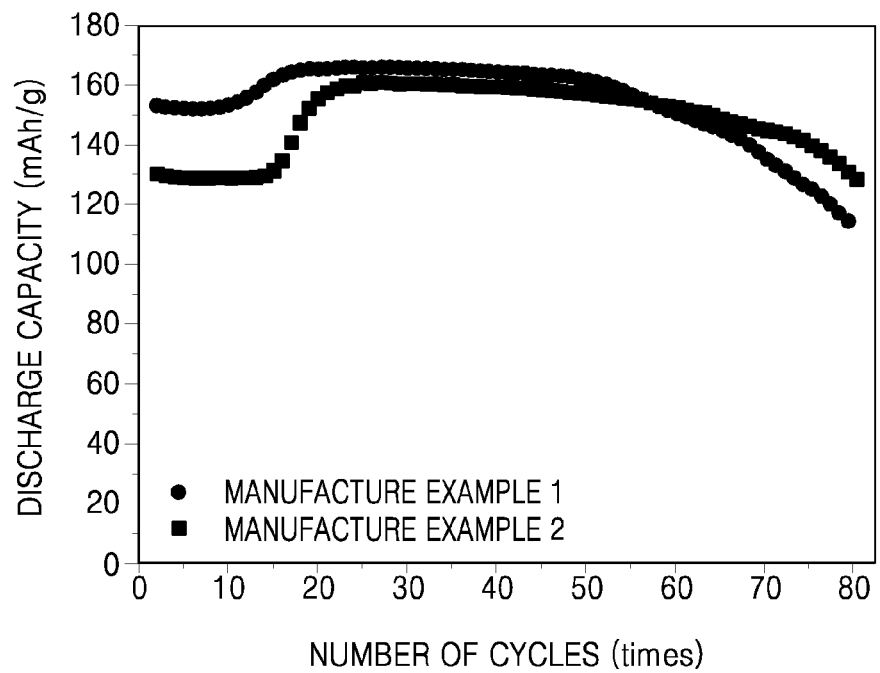
Figure 15:
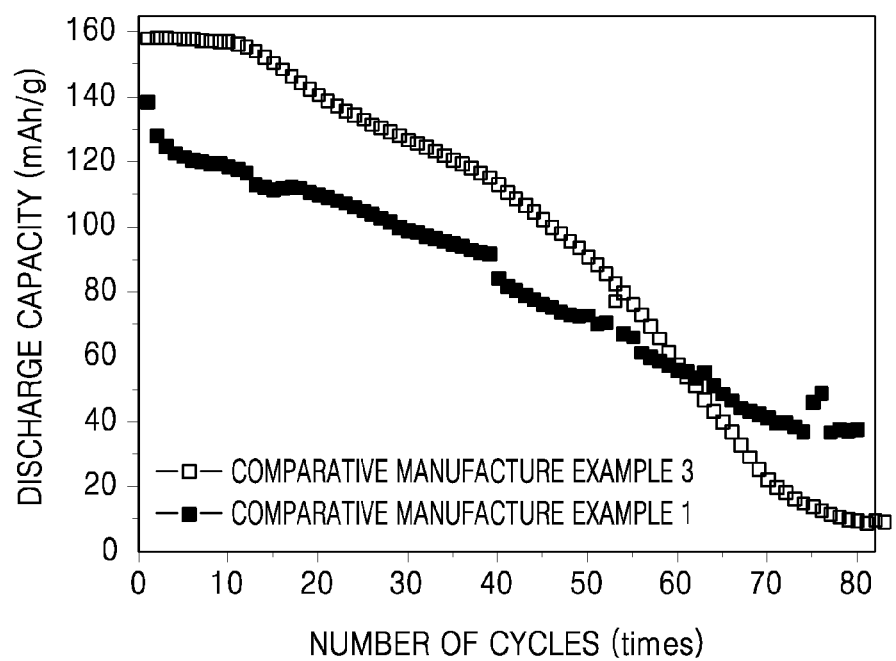

The results of the charge-discharge characteristic evaluation of the lithium secondary batteries of Manufacture Examples 1 and 2 and Comparative Manufacture Examples 1 and 3 are shown in Table 3 and FIGS. 13 to 15.

TABLE 3

| Example | 50$^{th}$ cycle capacity retention rate (%) | 80$^{th}$ cycle capacity retention rate (%) |
|---|---|---|
| Manufacture Example 1 | 100 | 73 |
| Manufacture Example 2 | 100 | 100 |
| Comparative Manufacture Example 1 | 60 | 6 |
| Comparative Manufacture Example 3 | 54 | 28 |

Referring to Table 3 and FIGS. 13 to 15, the lithium secondary batteries of Manufacture Examples 1 and 2 were found to have remarkably improved capacity retention rates, compared to those of the lithium secondary batteries of Comparative Manufacture Examples 1 and 3

The lithium secondary batteries of Manufacture Examples 3 to 8 represented nearly the same capacity retention rate characteristics as those of the lithium secondary battery of Manufacture Example 1.

Evaluation Example 5: Ionic Conductivity Measurement

Ionic conductivities of the electrolytes of Examples 1 to 8 and Comparative Example 1 were measured as follows. The resistance of each of the electrolytes was measured while scanning the temperature thereof with a bias voltage of about 10 mV in a frequency range of about 1 Hz to 1 MHz to evaluate an ionic conductivity thereof. Some of the results are shown in FIG. 16.

Figure 16:
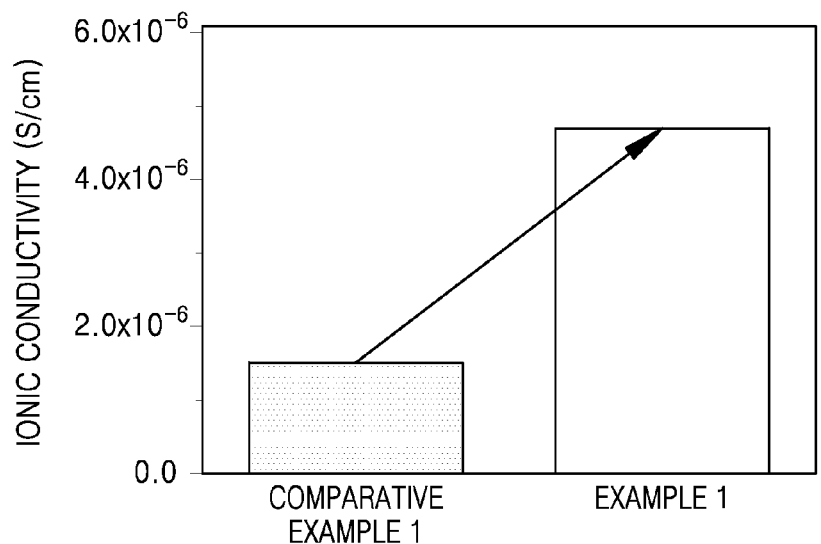
FIG. 16 is a diagram illustrating the results of ionic conductivity (Siemens per centimeter, S/cm) measurement of the electrolytes prepared according to Example 1 and Comparative Example 1.

Referring to FIG. 16, the electrolyte of Example 1 was found to have a remarkably high ionic conductivity, compared to that of the electrolyte of Comparative Example 1.

The Electrolytes of Examples 2 to 8 had Nearly the Same Ion Conductivity as that of the Electrolyte of Example 1

Evaluation Example 6: Tensile Strength Measurement

Tensile strengths of the electrolytes of Example 1 and Comparative Example 1 were measured using a DMA800 (available from TA Instruments). Electrolyte samples for the tensile strength measurement were prepared according to the ASTM standard D638 (Type V specimens).

The tensile strengths of the electrolytes were measured at about 25° C., a relative humidity of about 30%, and a rate of 5 millimeters per minute (mm/min). The results of the tensile strength measurement are shown in FIG. 17.

Figure 17:
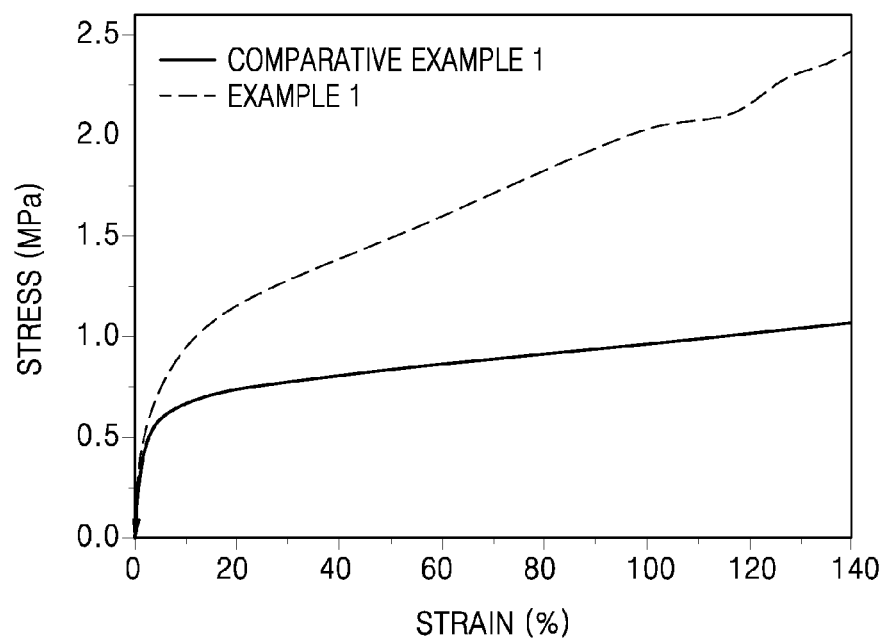
FIG. 17 is a graph of stress (mega Pascals, mPa) versus strain (percent, %) illustrating the results of tensile strength measurement of the electrolytes prepared according to Example 1 and Comparative Example 1.

Referring to FIG. 17, the electrolyte of Example 1 was found to have a remarkably high tensile strength, compare to that of the electrolyte of Comparative Example 1.

Evaluation Example 7: Electrochemical Stability Evaluation

The lithium secondary batteries of Manufacture Examples 1 to 3 and Comparative Manufacture Example 1 were analyzed by cyclic voltametry at a scan rate of about 1 milli Volts per second (mV/sec) in a voltage range of about 0 V to about 6 V (with respect to Li) to evaluate electrochemical stability of the electrolyte coated on the lithium metal thin film anode thereof.

As a result of the electrochemical stability evaluation, the lithium secondary batteries of Manufacture Examples 1 to 3 were found to cause no decomposition of the electrolyte or side reactions other than intercalation and deintercalation of lithium at a voltage of about 0 V and were also found to have a very low current density of about 0.02 mA/cm$^2$ caused from side reaction such as oxidation at a voltage of up to about 5.0 V, indicating that the lithium secondary batteries of Manufacture Examples 1 to 3 may be electrochemically stable at a voltage of about 0 V to about 5 V.

As described above, according to the one or more of the present embodiments, an electrolyte may have improved ion conductivity, improved mechanical properties, and improved stability against liquid electrolyte. A lithium secondary battery with improved capacity retention rate may be manufactured using the electrolyte.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present inventive concept as defined by the following claims.

What is claimed is:
1. An electrolyte comprising
    a copolymer comprising
        (i) an ion-conductive domain comprising an ion-conductive segment of the copolymer, wherein the ion-conductive segment comprises a plurality of ion-conductive units, and
        (ii) a structural domain comprising a structural segment of the copolymer, wherein the structural segment comprises a plurality of structural units, wherein the ion-conductive domain and the structural domain are covalently linked, and
    a polymer network phase, which is physically coupled to, included in, and completely surrounded by the ion-conductive domain of the copolymer,
    wherein the polymer network phase comprises a polymerization product of at least one polymerizable reactive group-including compound selected from a multi-functional monomer with a polymerizable reactive group, an inorganic particle with a polymerizable reactive group, and an ionic liquid with a polymerizable reactive group,
    wherein the polymerizable reactive group of the inorganic particle is at least one selected from a functional group comprising an ethylenically unsaturated bond, an epoxy group, and an aldehyde group.
2. The electrolyte of claim 1, wherein the copolymer is a block copolymer.

3. The electrolyte of claim 1, wherein the polymerizable group of the multi-functional monomer and the ionic liquid is at least one selected from a functional group comprising an ethylenically unsaturated bond, a hydroxyl group, an amino group, an amide group, an epoxy group, a carboxyl group, and an aldehyde group.

4. The electrolyte of claim 1, wherein the polymerizable group-including compound comprises at least one selected from a lithium ion-conductive moiety and a hydrophilic moiety.

5. The electrolyte of claim 1, wherein the multi-functional monomer with a polymerizable reactive group is at least one selected from a C5-C30 (meth)acrylate ester comprising at least two carbon-carbon double bonds, a poly(C3-C30 (meth)acrylate ester) comprising at least two carbon-carbon double bonds, a C4-C30 aliphatic compound comprising at least two carbon-carbon double bonds, and a C4-C30 aromatic compound comprising at least two carbon-carbon double bonds.

6. The electrolyte of claim 1, wherein the multi-functional monomer with a polymerizable reactive group is at least one selected from polyethylene glycol diacrylate, polyethylene glycol dimethacrylate, ethoxylated trimethylolpropane triacrylate, ethoxylated trimethylolpropane trimethacrylate, 1,4-butadiene, 1,6-hexadiene, allyl acrylate, acrylated cinnamate, isoprene, butadiene, chloroprene, 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, ethylene glycol (meth)acrylate, 1,2-propylene glycol (meth)acrylate, 1,3-propylene glycol (meth)acrylate, acrylic acid, methacrylic acid, 2-(meth)acryloyloxy acetic acid, 3-(meth)acryloyloxy propionic acid, 4-(meth)acryloyloxy butyric acid, itaconic acid, maleic acid, 2-isocyanatoethyl (meth)acrylate, 3-isocyanatopropyl (meth)acrylate, 4-isocyanatobutyl (meth)acrylate, (meth)acrylamide, N-vinylpyrrolidone, ethylene dimethacrylate, diethylene glycol dimethacrylate, triethylene glycol dimethacrylate, trimethylol propane trimethacrylate, trimethylol propane triacrylate, 1,3-butanediol di(meth)acrylate, 1,6-hexanediol di(meth)acrylate, and N-vinyl caprolactam.

7. The electrolyte of claim 1, wherein an amount of the multi-functional monomer with a polymerizable reactive group is in a range of about 5 parts to about 50 parts by weight based on 100 parts by weight of the copolymer.

8. The electrolyte of claim 1, wherein an amount of the inorganic particles with a polymerizable reactive group is in a range of about 1 part to about 40 parts by weight based on 100 parts by weight of the copolymer.

9. The electrolyte of claim 1, wherein an amount of the ionic liquid with a polymerizable reactive group is in a range of about 5 parts to about 40 parts by weight based on 100 parts by weight of the copolymer.

10. The electrolyte of claim 1, wherein the ion-conductive units of the ion-conductive segment of the copolymer are not crosslinked.

11. The electrolyte of claim 1, wherein the ion-conductive segment of the copolymer comprising a plurality of ion-conductive repeating units is derived from at least one selected from polyethylene oxide, polypropylene oxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, poly-2-ethylhexylmethacrylate, polydecylacrylate, polyethylene vinyl acetate, polyimide, polyamine, polyamide, polyalkyl carbonate, polynitrile, polyphosphazine, polyolefin, and polydiene.

12. The electrolyte of claim 1, further comprising at least one type of inorganic particles selected from $SiO_2$, $TiO_2$, ZnO, $Al_2O_3$, $BaTiO_3$, cage-structured silsesquioxane, and a metal-organic framework.

13. The electrolyte of claim 1, wherein the inorganic particles with a polymerizable reactive group are at least one type of particles selected from silsesquioxane with a polymerizable reactive group, $SiO_2$ with a polymerizable reactive group, $TiO_2$ with a polymerizable reactive group, ZnO with a polymerizable reactive group, $Al_2O_3$ with a polymerizable reactive group, $BaTiO_3$ with a polymerizable reactive group, and a metal-organic framework with a polymerizable reactive group.

14. The electrolyte of claim 1, wherein the polymer network phase comprises a reaction product of:
   i) at least one polymerizable reactive group-including compound selected from a multi-functional monomer with a polymerizable reactive group, an inorganic particle with a polymerizable reactive group, and an ionic liquid with a polymerizable reactive group, and
   ii) at least one monofunctional monomer selected from a monofunctional acrylate monomer and a monofunctional methacrylate monomer.

15. The electrolyte of claim 14, wherein the monofunctional monomer is at least one selected from butyl acrylate, ethyl acrylate, methyl methacrylate, ethyl methacrylate, 2-ethylhexyl acrylate, decylacrylate, ethylene vinyl acetate, ethylene glycol monoacrylate, ethylene glycol monomethacrylate, hexyl acrylate, hexyl methacrylate, 2-ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, 1,1,1,3,3,3-hexafluoro isopropyl acrylate, 1,1,1,3,3,3-hexafluoro isopropyl methacrylate, 2,2,3,3,4,4,4-heptafluorobutyl acrylate, 2,2,3,3,4,4,4-heptafluorobutyl methacrylate, 2,2,3,3,4,4,5,5-octafluoropentyl acrylate, 2,2,3,3,4,4,5,5-octafluoropentyl methacrylate, 2,2,3,3,4,4,5,5,6,6,7,7-dodecafluoroheptyl acrylate, 2,2,3,3,4,4,5,5,6,6,7,7-dodecafluoroheptyl methacrylate, 3,3,4,4,5,5,6,6,7,7,8,8-tridecafluorooctyl acrylate, and 3,3,4,4,5,5,6,6,7,7,8,8-tridecafluorooctyl methacrylate.

16. The electrolyte of claim 14, wherein an amount of the monofunctional monomer is in a range of about 0.1 part to about 50 parts by weight based on 100 parts by weight of the copolymer.

17. The electrolyte of claim 1, further comprising at least one ionic liquid selected from compounds each comprising:
   i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and
   ii) an anion of at least one selected from $BF_4^-$, $PF_6^-$, $AsF_6^-$, $SbF_6^-$, $AlCl_4^-$, $HSO_4^-$, $ClO_4^-$, Cl—, Br—, I—, $CF_3SO_3^-$, $CF_3CO_2^-$, $(C_2F_5SO_2)(CF_3SO_2)N$—, $NO_3^-$, $Al_2Cl_7^-$, $CH_3COO^-$, $CH_3SO_3^-$, $(CF_3SO_2)_3C^-$, $(CF_3CF_2SO_2)_2N^-$, $(CF_3SO_2)_2N$—, $(FSO_2)_2N$—, $(CF_3)_2PF_4^-$, $(CF_3)_3PF_3^-$, $(CF_3)_4PF_2^-$, $(CF_3)_5P^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

18. The electrolyte of claim 1, further comprising at least one selected from an alkali metal salt and an alkali earth metal salt.

19. The electrolyte of claim 18, wherein the at least one selected from the alkali metal salt and the alkali earth metal salt is selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_3$C, LiN(SO$_2$F)$_2$, LiN(SO$_2$CF$_3$)$_2$, LiN(SO$_2$CF$_2$CF$_3$)$_2$, LiSbF$_6$, LiPF$_3$(CF$_2$CF$_3$)$_3$, LiPF$_3$(CF$_3$)$_3$, LiB(C$_{2O4}$)$_2$, NaSCN, NaSO$_3$CF$_3$, KTFSI, NaTFSI, Ba(TFSI)$_2$, and Ca(TFSI)$_2$.

20. The electrolyte of claim 1, wherein the electrolyte comprises:
   i) a block copolymer comprising a first block of polystyrene and a second block that comprises polyethylene oxide and a reaction product of one selected from polyethylene glycol diacrylate and polyethylene glycol dimethacrylate;
   ii) a block copolymer comprising a first block of polystyrene, a second block that comprises polyethylene oxide and a reaction product of one selected from polyethylene glycol diacrylate and polyethylene glycol dimethacrylate, and a third block of polystyrene;
   iii) a block copolymer comprising a first block of polystyrene, and a second block that comprises polyethylene oxide and a reaction product of one selected from trimethylolpropane triacrylate and trimethylolpropane trimethacrylate;
   iv) a block copolymer comprising a first block of polystyrene, and a second block that comprises polyethylene oxide and a reaction product of one selected from trimethylolpropane triacrylate and trimethylolpropane trimethacrylate, and a third block of polystyrene;
   v) a block copolymer comprising a first block of polystyrene, and a second block that comprises polyethylene oxide and a reaction product of one selected from polyethylene glycol diacrylate and polyethylene glycol dimethacrylate, and polyhedral oligomeric silsesquioxane with an acrylate group;
   vi) a block copolymer comprising a first block of polystyrene, a second block that comprises polyethylene oxide and a reaction product of one selected from polyethylene glycol diacrylate and polyethylene glycol dimethacrylate, and polyhedral oligomeric silsesquioxane with an acrylate group, and a third block of polystyrene;
   vii) a block copolymer comprising a first block of polystyrene, and a second block that comprises polyethylene oxide and a reaction product of one selected from trimethylolpropane triacrylate and trimethylolpropane trimethacrylate, and polyhedral oligomeric silsesquioxane with an acrylate group; or
   viii) a block copolymer comprising a first block of polystyrene, a second block that comprises polyethylene oxide and a reaction product of one selected from trimethylolpropane triacrylate and trimethylolpropane trimethacrylate, and polyhedral oligomeric silsesquioxane with an acrylate group, and a third block of polystyrene.

21. The electrolyte of claim 1, wherein the structural segment of the copolymer comprising a plurality of structural units is derived from:
   i) at least one selected from polystyrene, a hydrogenated polystyrene, polymethacrylate, poly(methyl methacrylate), polyvinylpyridine, polyimide, polyamide, polyethylene, polyisobutylene, polybutylene, polypropylene, poly(4-methylpentene-1), poly(butylene terephthalate), poly(isobutyl methacrylate), poly(ethylene terephthalate), polydimethylsiloxane, polyacrylonitrile, polymaleic acid, polymaleic anhydride, polymethacrylic acid, poly(cyclohexyl methacrylate), poly(cyclohexyl vinylether), poly(tert-butyl vinylether), and polyvinylidene fluoride, polydivinylbenzene, or
   ii) a copolymer comprising at least two repeating units of these polymers.

22. The electrolyte of claim 1, wherein the electrolyte comprises a reaction product obtained by radiation of light or by application of heat onto a composition that comprises:
   i) a block copolymer comprising a polymer block comprising an ion-conductive unit and a polymer block comprising a structural repeating unit,
   ii) at least one polymerizable reactive group-including compound, and
   iii) a polymerization initiator,
   wherein the at least one polymerizable reactive group-including compound is selected from a multi-functional monomer with a polymerizable reactive group, an inorganic particle with a polymerizable reactive group, and an ionic liquid with a polymerizable reactive group.

23. The electrolyte of claim 2, wherein an intensity ratio I (P$_B$)/ I (P$_A$) of peak P$_B$ to peak P$_A$ in X-ray diffraction spectra of the electrolyte with respect to a CuK-α X-ray wavelength of 1.541 Angstroms is in a range of about 1.0 to about 1.3, wherein the peak P$_A$ and the peak P$_B$ are related with interchain crystallinity and intrachain crystallinity, respectively, in a polymer block of the ion-conductive domain of the block copolymer.

24. The electrolyte of claim 1, further comprising at least one selected from a liquid electrolyte, a solid electrolyte, a gel electrolyte, a polymer ionic liquid, and a separator.

25. The electrolyte of claim 24, wherein the liquid electrolyte comprises at least one selected from an ionic liquid, an organic solvent, an alkali metal salt, and an alkali earth metal salt.

26. The electrolyte of claim 1, wherein the electrolyte has an ionic conductivity of about $3.0 \times 10^{-6}$ Siemens per meter or greater at about 25° C.

27. The electrolyte of claim 1, wherein the electrolyte has a tensile strength of 2.0 mega Pascals or greater at about 25° C.

28. The electrolyte of claim 1, wherein an interfacial resistance R$_i$ at about 25° C. between the electrolyte and lithium metal derived from a Nyquist plot that is obtained from an impedance measurement is about 10% or less than the resistance of bare lithium metal.

29. The electrolyte of claim 1, wherein the electrolyte has an oxidation current or reduction current of about 0.05 milli Amperes per square centimeter or less in a voltage range of about 0.0 Volts to about 6.0 Volts with respect to lithium metal.

30. A method of preparing an electrolyte, the method comprising:
   obtaining an electrolyte composition that comprises a copolymer comprising
      (i) an ion-conductive domain comprising an ion-conductive segment of the copolymer, wherein the ion-conductive segment comprises a plurality of ion-conductive units, and
      (ii) a structural domain comprising a structural segment of the copolymer, wherein the structural segment comprises a plurality of structural units, wherein the ion-conductive domain and the structural domain are covalently linked,
      (iii) a polymerizable reactive group-including compound, and (iv) a polymerization initiator; and radiating light or applying heat onto the electrolyte composition to obtain the electrolyte of claim 1.

31. The method of claim 30, wherein the polymerizable reactive group-including compound is at least one selected from:
 i) a multi-functional monomer with a polymerizable reactive group,
 ii) an inorganic particle with a polymerizable reactive group, and
 iii) an ionic liquid with a polymerizable reactive group.

32. The method of claim 30, further comprising adding at least one selected from:
 i) at least one monofunctional monomer selected from a monofunctional acrylate monomer and a monofunctional methacrylate monomer,
 ii) at least one selected from an ionic liquid and a polymer ionic liquid,
 iii) a plurality of inorganic particles, and
 iv) at least one selected from an alkali metal salt and an alkali earth metal salt.

33. The method of claim 30, wherein the light is ultraviolet light.

34. A lithium secondary battery comprising:
 an anode,
 a cathode, and
 the electrolyte of claim 1 disposed between the anode and the cathode.

35. The lithium secondary battery of claim 34, wherein the anode is a lithium metal or lithium metal alloy electrode, and the lithium secondary battery further comprises at least one selected from a liquid electrolyte, a gel electrolyte, a polymer electrolyte, and a polymer ionic liquid, disposed between the electrolyte and the cathode.

36. An electrolyte comprising
 a copolymer comprising
  (i) an ion-conductive domain comprising an ion-conductive segment of the copolymer, wherein the ion-conductive segment comprises a plurality of ion-conductive units, and
  (ii) a structural domain comprising a structural segment of the copolymer, wherein the structural segment comprises a plurality of structural units, wherein the ion-conductive domain and the structural domain are covalently linked, and
 a polymer network phase, which is physically coupled only to, included in, and completely surrounded by the ion-conductive domain of the copolymer,
 wherein the polymer network phase comprises a polymerization product of at least one polymerizable reactive group-including compound selected from a multi-functional monomer with a polymerizable reactive group, an inorganic particle with a polymerizable reactive group, and an ionic liquid with a polymerizable reactive group,
 wherein the polymerizable reactive group of the inorganic particle is at least one selected from a functional group comprising an ethylenically unsaturated bond, an epoxy group, and an aldehyde group, wherein the polymerizable group-including compound comprises at least one selected from a lithium ion-conductive moiety and a hydrophilic moiety.

* * * * *